US009477165B2

(12) United States Patent
Miyaake et al.

(10) Patent No.: US 9,477,165 B2
(45) Date of Patent: Oct. 25, 2016

(54) TONER, PROCESS CARTRIDGE, DEVELOPER, AND IMAGE FORMING APPARATUS

(71) Applicants: Azumi Miyaake, Kanagawa (JP); Hiroshi Yamashita, Shizuoka (JP); Daisuke Asahina, Shizuoka (JP); Ryo Miyakoshi, Shizuoka (JP); Satoyuki Sekiguchi, Shizuoka (JP)

(72) Inventors: Azumi Miyaake, Kanagawa (JP); Hiroshi Yamashita, Shizuoka (JP); Daisuke Asahina, Shizuoka (JP); Ryo Miyakoshi, Shizuoka (JP); Satoyuki Sekiguchi, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/658,698

(22) Filed: Mar. 16, 2015

(65) Prior Publication Data

US 2015/0268574 A1    Sep. 24, 2015

(30) Foreign Application Priority Data

Mar. 18, 2014  (JP) ................................ 2014-054435
Jan. 6, 2015   (JP) ................................ 2015-001157

(51) Int. Cl.
*G03G 9/08* (2006.01)
*G03G 9/087* (2006.01)
(Continued)

(52) U.S. Cl.
CPC ............ *G03G 9/08733* (2013.01); *C08G 63/16* (2013.01); *C08G 81/00* (2013.01); *C08L 67/02* (2013.01); *G03G 9/08755* (2013.01)

(58) Field of Classification Search
CPC ...................... G03G 9/08755; G03G 9/08733

USPC ....................................................... 430/109.4
See application file for complete search history.

(56) References Cited

U.S. PATENT DOCUMENTS

2006/0204880 A1* 9/2006 Mizutani ............. G03G 9/0806
                                                      430/109.4
2012/0231387 A1* 9/2012 Sugiura .............. G03G 9/09307
                                                      430/108.4

FOREIGN PATENT DOCUMENTS

JP     2004-138924     5/2004
JP     2008-052192     3/2008
(Continued)

OTHER PUBLICATIONS

Ashish K. Khandpur et al., Polyisoprene-Polystyrene Diblock Copolymer Phase Diagram near the Order-Disorder Transition, Macromolecules, 28 , 8796-8806(1995).

(Continued)

*Primary Examiner* — Mark A Chapman
(74) *Attorney, Agent, or Firm* — Oblon, McClelland, Maier & Neustadt, L.L.P.

(57) ABSTRACT

A toner including a polyester resin having an amorphous polyester segment is provided. The amorphous polyester segment includes a condensation polymerization product between a carboxylic acid and an alcohol. The carboxylic acid includes both aliphatic and aromatic dicarboxylic acids. The toner deforms with a deformation rate of from 1.0% to 5.0% under a pressure of 100 gf at 40° C. and 80% RH. In a binarized image of an AFM phase image of the toner, first phase-contrast images serving as large-phase-difference portions are dispersed in second phase-contrast images serving as small-phase-difference portions, and the first phase-contrast images have a dispersion diameter of 100 nm or less. An endothermic quantity Q1 obtained in a first heating of DSC is from 10 to 50 J/g, and a ratio of an endothermic quantity obtained in the second heating Q2 to that in first heating Q1 is 0.65 or less.

20 Claims, 6 Drawing Sheets

(51) Int. Cl.
 *C08G 81/00* (2006.01)
 *C08G 63/16* (2006.01)
 *C08L 67/02* (2006.01)

(56) References Cited

FOREIGN PATENT DOCUMENTS

| JP | 2008-287088 | 11/2008 |
|---|---|---|
| JP | 2012-027212 | 2/2012 |

OTHER PUBLICATIONS

M.A. van Dijk et al., Ordering Phenomena in Thin Block Copolymer Films Studied Using Atomic Force Microscopy, Macromolecules, 28, 6773-6778 (1995).
R. van den Berg et al., Atomic force microscopy of thin triblock copolymer films, Polymer, vol. 35, No. 26, 5778-5781 (1994).
Q. Zhong et al., Fractured polymer/silica fiber surface studied by tapping mode atomic force microscopy, Surface Science Letter, 290, 688-692 (1993).

* cited by examiner

TONER, PROCESS CARTRIDGE, DEVELOPER, AND IMAGE FORMING APPARATUS

CROSS-REFERENCE TO RELATED APPLICATIONS

This patent application is based on and claims priority pursuant to 35 U.S.C. §119(a) to Japanese Patent Application Nos. 2014-054435 and 2015-001157, filed on Mar. 18, 2014 and Jan. 6, 2015, respectively, in the Japan Patent Office, the entire disclosure of each of which is hereby incorporated by reference herein.

BACKGROUND

1. Technical Field

The present disclosure relates to a toner, a process cartridge, a developer, and an image forming apparatus.

2. Description of the Related Art

In a typical electrophotographic image forming apparatus, an electrically- or magnetically-formed latent image is visualized with toner. Specifically, in electrophotography, an electrostatic latent image is formed on a photoconductor and then developed into a toner image with toner. The toner image is transferred onto a transfer medium such as paper and then fixed thereon. In fixing the toner image on a transfer medium, heat fixing methods such as heat roller fixing method and heat belt fixing method are widely employed owing to their high energy efficiency.

In recent years, demand for high-speed-printing and energy-saving image forming apparatus is increasing. In accordance with this demand, toner is required to be fixable at much lower temperatures while providing much higher image quality. One approach for achieving low-temperature fixability of toner involves reducing the softening temperature of the binder resin of the toner. However, such a low softening temperature of the binder resin is likely to cause offset phenomenon in which a part of a toner image is adhered to a surface of a fixing member and then retransferred onto a transfer medium in the fixing process. Reducing the softening temperature of the binder resin also reduces heat-resistant storage stability of the toner. As a result, blocking phenomenon in which toner particles fuse together is caused especially in high-temperature environments. In addition, other problems are likely to occur such that toner fuses to contaminate a developing device or carrier particles, or toner forms its film on a surface of a photoconductor.

As a technique for solving these problems, using crystalline resins for the binder resin of toner is known. Crystalline resins have a property of rapidly softening at the melting point. This property makes it possible to lower fixable temperature of toner without degrading its heat-resistant storage stability at or below the melting point. Namely, it is possible to achieve an excellent balance of low-temperature fixability and heat-resistant storage stability at the same time. Although having high toughness, while at the same time, crystalline resins having a melting point which exhibits low-temperature fixability are plastic deformable due to their softness. The technique of merely using a crystalline resin for the binder resin results in a toner having poor mechanical durability, which causes various problems such as deformation, aggregation, and sticking within image forming apparatus and contamination of image forming members.

In view of this situation, a number of toners using both a crystalline resin and an amorphous resin have been proposed. Such toners are generally superior to those using only an amorphous resin in terms of the balance between low-temperature fixability and heat-resistant storage stability. However, if the crystalline resin is exposed at the surface of toner, the toner particles may aggregate under agitation stress in developing device to cause transfer deficiency, or may contaminate carrier particles and the inside of apparatus. In addition, external additive may be embedded in the surface of toner to degrade chargeability and fluidity of toner. Accordingly, the addition amount of crystalline resin has been limited. It has been difficult to take advantage of crystalline resins.

In addition, a number of toners have been proposed which use a resin in which crystalline segments and amorphous segments are chemically bonded. Moreover, toners using a resin in which crystalline polyester and amorphous polyester are chemically bonded have also been proposed.

Such toners can achieve a good balance between low-temperature fixability and heat-resistant storage stability but their softness arising from the crystalline segment has not basically been remedied. The problem regarding mechanical durability of toner has not been solved by these toners.

A toner using a crystalline resin has another problem of rub resistance of the resulting image. When the toner is once melted by heat to be fixed on a transfer medium, it will take a certain time until the crystalline resin recrystallizes and the surface of the image cannot promptly recover its hardness. As a result, the surface of the image may be scratched upon contact with discharge roller or conveyance members in the paper discharge process after the image fixing process, reducing the gloss of the image.

SUMMARY

In accordance with some embodiments of the present invention, a toner is provided. The toner includes a binder resin including a polyester resin having an amorphous polyester segment. The amorphous polyester segment includes a condensation polymerization product between a carboxylic acid and an alcohol. The carboxylic acid includes an aliphatic dicarboxylic acid and an aromatic dicarboxylic acid. When the toner is subjected to a pressure of 100 gf at a temperature of 40° C. and a relative humidity of 80%, the toner deforms with a deformation rate of from 1.0% to 5.0%. When the toner is observed with an atomic force microscope in tapping mode to obtain a phase image and the phase image is binarized by using an intermediate value between maximum and minimum phase difference values to obtain a binarized image, the binarized image consists of first phase-contrast images serving as large-phase-difference portions and second phase-contrast images serving as small-phase-difference portions with the first phase-contrast images dispersed in the second phase-contrast images and the first phase-contrast images having a dispersion diameter of 100 nm or less. When the toner is subjected to a differential scanning calorimetric measurement, an endothermic quantity $Q_1$ measured in a first heating is from 10 to 50 J/g, and a ratio $Q_2/Q_1$ of an endothermic quantity $Q_2$ measured in a second heating to the endothermic quantity $Q_1$ measured in the first heating is 0.65 or less.

In accordance with some embodiments of the present invention, a process cartridge detachably mountable on image forming apparatus is provided. The process cartridge includes an electrostatic latent image bearer and a developing device to develop an electrostatic latent image formed on the electrostatic latent image bearer into a visible image with the above toner.

In accordance with some embodiments of the present invention, a developer is provided. The developer includes the above toner and a carrier.

In accordance with some embodiments of the present invention, an image forming apparatus is provided. The image forming apparatus includes an electrostatic latent image bearer, an electrostatic latent image forming device, and a developing device. The electrostatic latent image forming device forms an electrostatic latent image on the electrostatic latent image bearer. The developing device develops the electrostatic latent image into a visible image with the above toner.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
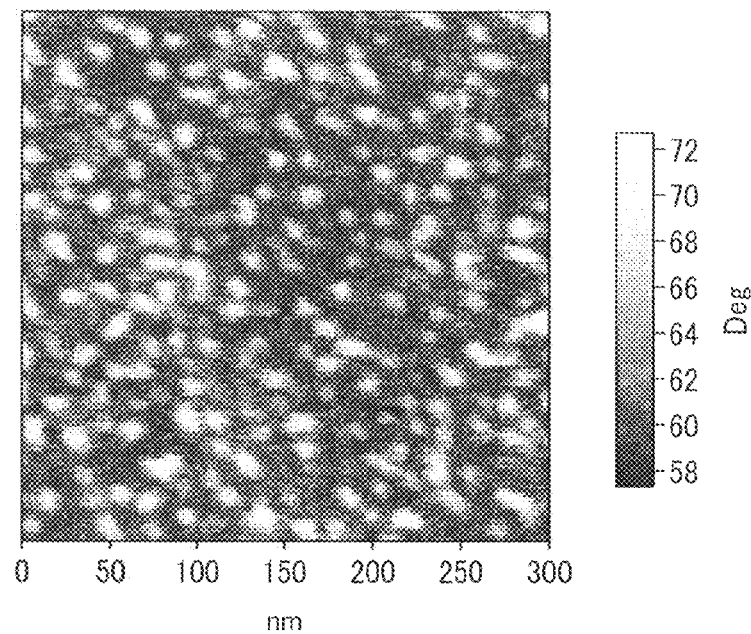
FIG. 1 is an example of a phase image of a toner including a copolymer according to some embodiments of the present invention.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

One object of the present invention is to provide a toner which has a certain level of sharply-melting property for achieving an excellent balance between low-temperature fixability and heat-resistant storage stability and which does not deteriorate even under high-temperature and high-humidity conditions such as summer.

The inventors of the present invention have discovered that the above-described problems can be solved by a toner including a block copolymer having a crystalline segment and an amorphous polyester segment, when its deformation rate to a pressure under high-temperature and high-humidity condition is properly controlled.

In accordance with some embodiments of the present invention, a toner which has a certain level of sharply-melting property for achieving an excellent balance between low-temperature fixability and heat-resistant storage stability and which does not deteriorate even under high-temperature and high-humidity conditions such as summer is provided. Generally, a toner using a crystalline resin tends to deform under high-temperature and high-humidity conditions, causing toner aggregation or embedment of external additives in the toner. The toner according to some embodiments of the present invention avoids the problems specific to a toner including a crystalline resin, such as toner aggregation caused in developing device or toner contamination of carrier particles or the inside of apparatus caused by poor mechanical durability of the toner, and deterioration in chargeability and fluidity caused by embedment of external additives to the surface of the toner.

In accordance with some embodiments of the present invention, when the toner is subjected to a pressure of 100 gf at a temperature of 40° C. and a relative humidity of 80%, the toner deforms with a deformation rate of from 1.0% to 5.0%. Being sensitive to humidity, toners will plasticize upon absorption of water under high-humidity conditions and become easy to deform. The higher deformation rate indicates that the toner becomes much easier to deform under high-humidity conditions, causing toner deformation or aggregation or embedment of external additives. If no deformation is caused in the toner, low-temperature fixing will be inhibited. Therefore, the lower limit of the deformation rate is set to 1.0%. The upper limit of the deformation rate is preferably 4.0% or less.

The amount of crystalline components in the binder resin can be estimated from an endothermic quantity measured by a differential scanning calorimetric (DSC) measurement. A greater endothermic quantity indicates a greater amount of crystalline components. As the amount of crystalline components increases, humidity resistance improves. By contrast, as the amount of crystalline components decreases, humidity resistance and low-temperature fixability deteriorate. When the amount of crystalline components is too large, the toner will reduce its electric resistance and mechanical strength. Accordingly, an endothermic quantity Q1, measured in the first heating of the DSC measurement of the toner, is set to from 10 to 50 J/g, preferably from 15 to 45 J/g, and most preferably from 24 to 40 J/g.

To improve both low-temperature fixability and humidity resistance, it is preferable that the crystalline components and a wax are used in combination. In this case, the endothermic quantity includes those arose from both the wax and the crystalline components. When a wax is used alone, Q2/Q1 becomes greater than 0.65 approaching 1.00.

According to some embodiments of the present invention, a combination of a crystalline segment and an amorphous polyester segment which is capable of restraining the molecular motion of the crystalline segment is selected. They are controlled to form a microphase dispersion structure within the toner. The microphase dispersion structure is a fine sea-island structure with the sea consisting of the amorphous polyester segment and the island consisting of the crystalline segment. With such a configuration, at or below the melting point of the crystalline segment, the amorphous polyester segment restrains the molecular motion and therefore the toner exhibits excellent mechanical durability. The toner rapidly undergoes elastic relaxation and deformation within the fixable temperature range. At the time the paper having the fixed image is discharged, the amorphous polyester segment immediately suppresses excessive molecular motion of the crystalline segment, and at the same time, the fine sea-island structure prevents the crystalline segment from being exposed at the surface of the image with rapid recovery of the hardness of the image.

Depending on the types of resins to be combined, in some cases, the toner adsorbs moisture under high-temperature and high-humidity conditions and becomes easy to deform.

The inventors of the present invention have found that, in a case in which a crystalline segment (A) and an amorphous polyester segment (B) are combined, and the amorphous polyester segment (B) is prepared from not only aromatic carboxylic acid monomers but also straight-chain aliphatic dicarboxylic acid monomers, such as adipic acid and succinic acid, humidity resistance is improved without changing the glass transition temperature (Tg) very much.

When the crystalline segment and the amorphous polyester segment are copolymerized, and they are compatible with each other, it is likely that they become soluble in one another and the resulting block copolymer has a reduced Tg. In general, when the Tg is lower than normal temperature, heat-resistant storage stability is adversely affected. By contrast, in the present embodiment, heat-resistant storage stability is less affected even when the Tg arose from the amorphous polyester segment is low because the crystalline segment restrains the molecular motion of the crystalline segment. Nevertheless, when the Tg is low, the toner is likely to adsorb moisture and plasticize when the humidity is increased. To maintain storage stability even under high humidity conditions without affecting low-temperature fixability, it is preferable that the Tg is set to 40° C. or more. Further, to achieve a good balance between storage stability and low-temperature fixability, it is preferable that the Tg is set to 70° C. or less. Setting the Tg to 40° C. or more can be achieved by, for example, increasing the Tg of the amorphous segment, selecting a proper combination of an amorphous segment and a crystalline segment which become poorly soluble in one another when preparing a block copolymer thereof, or annealing.

To become less affected by high-temperature and high-humidity conditions, increasing the molecular weight or hardness of the toner is also effective. Among various approaches, including a prepolymer in the binder resin is preferable. By including a prepolymer in the binder resin, the toner becomes less affected by humidity while maintaining low-temperature fixability.

In a case in which the binder resin includes crystalline components, increasing the ratio of the crystalline components is also effective. This is because the crystalline components are less molecular-movable and moisture-absorbable. As described above, the amount of crystalline components in the binder resin can be estimated from an endothermic quantity measured by the DSC measurement. The endothermic quantity measured in the first heating of the DSC measurement is from 10 to 50 J/g. Preferably, the endothermic quantity derived from the crystalline segment measured in the first heating of the DSC measurement is from 8 to 40 J/g.

To have low-temperature fixability without causing the problems regarding imaging process, the molar ratio (A/B) of the crystalline segment (A) to the amorphous polyester segment (B) is preferably from 10/90 to 40/60. As the ratio of the crystalline segment (A) increases, low-temperature fixability improves but rub resistance of the image becomes worse. As the ratio of the crystalline segment (A) decreases, low-temperature fixability becomes worse.

Preferably, the melting point derived from the crystalline segment (A) measured in the first heating of the DSC measurement is from 50° C. to 85° C. When the melting point is too high, sharply-melting effect is not exerted at a target fixing temperature. When the melting point is too low, storage stability becomes worse.

Binder Resin

In accordance with some embodiments of the present invention, the binder resin includes a copolymer, and optionally other components, if necessary. Copolymer The copolymer has a crystalline segment and an amorphous polyester segment. Preferably, the copolymer is a block copolymer having a crystalline segment and an amorphous polyester segment. Preferably, the crystalline segment and the amorphous polyester segment are bound together by urethane or urea bond. In this case, the upper-limit fixable temperature can be maintained at a high level.

The copolymer preferably has a melting point of from 50° C. to 75° C. When the melting point is less than 50° C., the copolymer is likely to melt at low temperatures, degrading heat-resistant storage stability of the toner. When the melting point exceeds 75° C., the copolymer melts insufficiently upon application of heat at the fixing, degrading low-temperature fixability of the toner.

Whether a toner includes the copolymer or not can be determined by the following procedure, for example.

First, a toner is dissolved in a solvent such as ethyl acetate and THF (tetrahydrofuran), or subjected to soxhlet extraction. The resulting solution is subjected to centrifugal separation using a high-speed centrifugal separator having a cooling function at a temperature of 20° C. and a revolution of 10,000 rpm for 10 minutes to separate soluble components from insoluble components. The soluble components are subjected to several times of reprecipitation and then purification. In this procedure, highly-cross-linked resin components, pigments, and waxes can be separated from each other.

Next, the isolated resin component is subjected to gel permeation chromatography (GPC) to obtain its molecular weight, molecular weight distribution, and chromatogram. When the obtained chromatogram has multiple peaks, the sample is fractionated with a fraction collector, and each fraction is formed into a film. Each resin component is separated and purified by this operation and then subjected to analytic operations. The film-forming process of each fraction is performed by means of reduced-pressure drying on a TEFLON® petri dish to evaporate the solvent.

Each purified film is subjected to a differential scanning calorimetric (DSC) measurement to obtain glass transition temperature (Tg), melting point, and crystallization behavior. If a crystallization peak is observed during cooling, the film is subjected to annealing for at least 24 hours within that temperature range so that the crystalline component grows. If crystallization is not observed but a melting peak is observed, the film is subjected to annealing at a temperature 10° C. lower than the melting point. Various transition temperatures and the existence of crystalline skeleton can be confirmed by this procedure.

Next, whether a phase separation structure exists or not is confirmed by SPM (scanning probe microscope) and/or TEM (transmission electron microscope) observation. Confirmation of the existence of a microphase separation structure indicates that the sample is a copolymer or a system having high intramolecular and/or intermolecular interaction.

The purified films are further subjected to the measurements with FT-IR (Fourier-transform infrared spectrometry), NMR (nuclear magnetic resonance; 1H, 13C), and GC/MS (gas chromatography mass spectrometry), and optionally NMR (2D) for detailed analysis of molecular structure, to obtain composition, structure, and other various properties, for example, the existence of polyester skeleton or urethane bond and the composition and compositional ratio thereof.

Whether a toner includes the copolymer or not can be determined by comprehensive evaluation of the above analyses.

Detailed procedures for the above analyses are described below.

Example of DSC Measurement

A measurement sample in an amount of 5 mg is charged in a simple sealed pan Tzero (from TA Instruments) and subjected to a measurement with a differential scanning calorimeter (Q2000 from TA Instruments).

In the measurement, under nitrogen gas flow, the sample is heated from 10° C. to 150° C. at a heating rate of 10° C./min (i.e., the first heating) and kept for 5 minutes, and then cooled to −50° C. at a cooling rate of 10° C./min and kept for 5 minutes.

Next, the sample is heated at a heating rate of 10° C./min (i.e., the second heating) to measure thermal change. A graph showing the relation between the quantity of heat absorption or generation and temperature is drawn. Glass transition temperature (Tg), cold crystallization temperature, melting point, crystallization temperature, etc., are determined in accordance with known methods. Tg is determined from the DSC curve in the first heating by the midpoint method. It is possible to separate enthalpy relaxation components by setting the heating rate to 3° C./min and the modulation period to ±0.5° C./min.

Example of GPC Measurement

Gel permeation chromatography (GPC) measurement can be made by a gel permeation chromatographic instrument (such as HLC-8220 GPC from Tohsoh Corporation) preferably equipped with a fraction collector.

Triplet of 15-cm column TSKgel Super HZM-H is preferably used. First, a 0.15% tetrahydrofuran (THF, containing a stabilizer, from Wako Pure Chemical Industries, Ltd.) solution of a sample resin is prepared. The solution is filtered with 0.2-nm filter, and the filtrate is used as a specimen in succeeding procedures. Next, 100 µL of the specimen are injected into the instrument and subjected to a measurement at 40° C. and a flow rate of 0.35 mL/min.

A molecular weight is determined with reference to a calibration curve compiled from monodisperse polystyrene standard samples. As the polystyrene standard samples, Showdex STANDARD series from Showa Denko K.K. and toluene can be used. Three kinds of THF solutions A, B, and C of monodisperse polystyrene standard samples having the following compositions are prepared and subjected to the measurement under the above-described conditions. A calibration curve is compiled with light-scattering molecular weights of the monodisperse polystyrene standard samples that are represented by retention time for the peaks.

Solution A: 2.5 mg of S-7450, 2.5 mg of S-678, 2.5 mg of S-46.5, 2.5 mg of S-2.90, and 50 mL of THF Solution B: 2.5 mg of S-3730, 2.5 mg of S-257, 2.5 mg of S-19.8, 2.5 mg of S-0.580, and 50 mL of THF Solution C: 2.5 mg of S-1470, 2.5 mg of S-112, 2.5 mg of S-6.93, 2.5 mg of toluene, and 50 mL of THF A refraction index (RI) detector is preferably used as the detector. An ultraviolet (UV) detector that is more sensitive is preferably used when fractionation is conducted.

Example of SPM Observation

The internal dispersion state of the binder resin can be confirmed from its phase image obtained with an SPM such as an atomic force microscope (AFM) in tapping mode.

Preferably, the binder resin has a structure such that soft portions observed as large-phase-difference images are finely dispersed in hard portions observed as small-phase-difference images. In particular, the binder resin has a structure such that the second phase-contrast images serving as hard and small-phase-difference images constitute the outer phase and the first phase-contrast images serving as soft and large-phase-difference images constitute the inner phase with the first phase-contrast images finely dispersed in the second phase-contrast images.

The sample for obtaining phase images can be prepared by, for example, cutting the binder resin block into sections with ultramicrotome ULTRACUT UCT from Leica under the following conditions.

Cutting thickness: 60 nm
Cutting speed: 0.4 mm/sec
Knife: Diamond knife (Ultra Sonic 35°)

The AFM phase image can be obtained with, for example, an instrument MFP-3D from Asylum Research and a cantilever OMCL-AC240TS-C3 under the following conditions.

Target amplitude: 0.5 V
Target percent: −5%
Amplitude setpoint: 315 mV
Scan rate: 1 Hz
Scan points: 256×256
Scan angle: 0°

Example of TEM Observation (1) A sample is exposed to atmosphere of $RuO_4$ aqueous solution for 2 hours to get dyed.

(2) The sample is trimmed with a glass knife and then cut into sections with an ultramicrotome under the following cutting conditions.

Cutting Conditions
Cutting thickness: 75 nm
Cutting speed: from 0.05 to 0.2 mm/sec
Knife: Diamond knife (Ultra Sonic 35°)

(3) The section is fixed on a mesh and exposed to atmosphere of $RuO_4$ aqueous solution for 5 minutes to get dyed.

Observation Conditions
Instrument: Transmission electron microscope JEM-2100F from JEOL Ltd.
Acceleration voltage: 200 kV
Observation: Bright-field method
Settings: Spot size 3, CLAP 1, OLAP 3, Alpha 3

Example of FT-IR Measurement

Fourier transform infrared spectroscopy (FT-IR) measurement can be made by an FT-IR spectrometer (Spectrum One from PerkinElmer Co., Ltd.). The scan number, resolution capability, and wavelength region are set to 16, 2 $cm^{-1}$, and mid-infrared region (400 to 4,000 $cm^{-1}$), respectively.

Example of NMR Measurement

A sample is dissolved in deuterated chloroform as much as possible. The solution is contained in an NMR sample tube having a diameter of 5 mm and subjected to a nuclear magnetic resonance (NMR) measurement. The measurement is made by an instrument JNM-ECX-300 from JEOL RESONANCE Inc.

The measurement temperature is set to 30° C. In $^1$H-NMR measurement, the cumulated number is set to 256 and the repeating time is set to 5.0 sec. In $^{13}$C-NMR measurement, the cumulated number is set to 10,000 and the repeating time is set to 1.5 sec. Components are identified from the obtained chemical shift. The compounding ratio is determined from the numeral value obtained by dividing the value of integral for an objective peak by the number of proton or carbon.

To conduct a more detailed structural analysis, DQF-COSY (Double Quantum Filtered Correlated Spectroscopy) measurement can be made. In this measurement, the cumulated number is set to 1,000 and the repeating time is set to 2.45 sec or 2.80 sec. It is possible to specify coupling condition, i.e., reaction site, from the obtained spectrum.

Example of GC/MS Measurement

A measurement can be made by a reaction pyrolysis gas chromatography mass spectrometry (GC/MS) using a reaction reagent. As the reaction reagent, a 10% methanol solution of tetramethylammonium hydroxide (TMAH) (from Tokyo Chemical Industry Co., Ltd.) is used. A GC-MS instrument QP2010 (from Shimadzu Corporation), a data analysis software program GCMSsolution (from Shimadzu Corporation), and a heating device Py2020D from Frontier Laboratories Ltd. are used.

Analysis Conditions
Reaction pyrolysis temperature: 300° C.
Column: Ultra ALLOY-5, L=30 m, ID=0.25 mm, Film=0.25 μm
Column heating: 50° C. (keep 1 minute)~10° C./min~330° C. (keep 11 minutes)
Carrier gas pressure: 53.6 KPa (constant)
Column flow rate: 1.0 mL/min
Ionization method: EI method (70 eV)
Mass range: m/z=from 29 to 700
Injection mode: Split (1:100)

In accordance with some embodiments of the present invention, a specific higher order structure, as represented by a micro phase separation structure, can be formed by use of the copolymer.

The copolymer is a polymer in which heterogeneous polymer chains are bound together with covalent bonds. Generally, in most cases, heterogeneous polymer chains are incompatible with each other. They are not to mingle with each other, like water and oil. In a simple mixed system, heterogeneous polymer chains are independently movable to cause macrophase separation. In a copolymer, by contrast, heterogeneous polymer chains are connected to each other and cannot cause macrophase separation. Although being connected to each other, heterogeneous polymer chains are likely to separate from each other as far as possible while homogeneous polymer chains become aggregated. As a result, the copolymer has alternating polymer-chain-size units each rich with a component A or a component B, for example. The phase separation structure is variable depending on the degree of phase mixing, composition, length (i.e., molecular weight and distribution), and/or mixing ratio of the components A and B. By controlling these properties, the phase separation structure can be controlled to take a periodic order mesostructure such as the spherical structure, cylindrical structure, gyroidal structure, or lamellar structure as described in A. K. Khandpur, S. Forster, and F. S. Bates, Macromolecules, 28 (1995) 8796-8806.

In accordance with some embodiments of the present invention, the copolymer is composed of a crystalline component and an amorphous component. When the copolymer having a microphase separation structure is controlled to recrystallize forming the periodic order mesostructure, crystalline phases with a size of several ten to several hundred nanometers can be orderly arranged while making the microphase separation structure of the melted body as a template. Taking advantage of such higher order structure, fluidity and deformability are given to toner based on solid-liquid phase transition phenomenon of the crystalline segment, especially in a situation where fluidity is required such as the fixing process, and the motion of the crystalline segment is restrained by containing the crystalline segment inside the structure, especially in a situation where neither fluidity nor deformability is required such as the storage or conveyance process after the fixing process.

The molecular structure, crystallinity, and higher order structure, such as microphase separation structure, of the copolymer can be readily analyzed by known methods. Specifically, these properties can be analyzed by means of high-resolution NMR (1H, 13C, etc.), differential scanning calorimetry (DSC), wide-angle X-ray diffractometry, (pyrolytic) GC/MS, LC/MS (liquid chromatograph mass spectrometry), infrared absorption spectroscopy (IR), atomic force microscopy (AFM), transmission electron microscopy (TEM), etc.

Crystalline Segment

Preferably, the crystalline segment is composed of a crystalline polyester resin, but is not limited thereto.

Crystalline Polyester Resin

Specific examples of the crystalline polyester resin include, but are not limited to, a polycondensation polyester resin prepared from a polyol and a polycarboxylic acid, a ring-opening polymerization product of lactone, and a polyhydroxycarboxylic acid. In particular, a crystalline polyester resin including a divalent aliphatic alcohol component and a divalent aliphatic carboxylic acid component is preferable.

Polyol

Specific examples of the polyol include, but are not limited to, a divalent diol and a polyol having 3 or more valences.

Specific examples of the divalent diol include, but are not limited to, a divalent aliphatic alcohol (e.g., a straight-chain aliphatic alcohol, a branched-chain aliphatic alcohol), an alkylene ether glycol having 4 to 36 carbon atoms, an alicyclic diol having 4 to 36 carbon atoms, an alkylene oxide (hereinafter "AO") adduct of the alicyclic diol, an AO adduct of a bisphenol, a polylactonediol, a polybutadienediol, a diol having carboxyl group, a diol having sulfonic acid group or sulfamic acid group, and a diol having another functional group such as salts of these materials. Among these compounds, an aliphatic alcohol having 2 to 36 carbon atoms in the main chain is preferable, and a straight-chain aliphatic alcohol having 2 to 36 carbon atoms in the main chain is more preferable.

Two or more of these diols can be used in combination.

The content of the straight-chain aliphatic alcohol based on total amount of the diol is preferably 80% by mol or more, more preferably 90% by mol or more. When the content is 80% by mol or more, the resin crystallinity improves, low-temperature fixability and heat-resistant storage stability go together, and the resin hardness improves, which is advantageous.

Specific examples of the straight-chain aliphatic alcohol include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these alcohols, ethylene glycol, 1,4-butanediol, 1,6-hexanediol, 1,8-octanediol, 1,10-decanediol, and 1,12-dodecanediol are preferable because the resulting crystalline polyester will have high crystallinity and sharply-melting property.

Specific preferred examples of the branched-chain aliphatic alcohol include a branched-chain aliphatic alcohol having 2 to 36 carbon atoms in the main chain. Specific examples of the branched-chain aliphatic alcohol include, but are not limited to, 1,2-propylene glycol, neopentyl glycol, and 2,2-diethyl-1,3-propanediol.

Specific examples of the alkylene ether glycol having 4 to 36 carbon atoms include, but are not limited to, diethylene glycol, triethylene glycol, dipropylene glycol, polyethylene glycol, polypropylene glycol, and polytetramethylene ether glycol.

Specific examples of the alicyclic diol having 4 to 36 carbon atoms include, but are not limited to, 1,4-cyclohexanedimethanol and hydrogenated bisphenol A.

Specific examples of the polyol having 3 or more valences include, but are not limited to, a polyvalent aliphatic alcohol having 3 or more valences and 3 to 36 carbon atoms, an AO 2 to 30 mol adduct of a trisphenol, an AO 2 to 30 mol adduct of a novolac resin, and an acrylic polyol such as a copolymer of hydroxyethyl acrylate or methacrylate with a vinyl monomer.

Specific examples of the polyvalent aliphatic alcohol having 3 or more valences and 3 to 36 carbon atoms include, but are not limited to, glycerin, trimethylolethane, trimethylolpropane, pentaerythritol, sorbitol, sorbitan, and polyglycerin.

Among these compounds, the polyvalent aliphatic alcohol having 3 or more valences and the AO adduct of a novolac resin are preferable, and the AO adduct of a novolac resin is more preferable.

Polycarboxylic Acid

Specific examples of the polycarboxylic acid include, but are not limited to, a dicarboxylic acid and a polycarboxylic acid having 3 or more valences.

Specific examples of the dicarboxylic acid include, but are not limited to, an aliphatic dicarboxylic acid and an aromatic dicarboxylic acid. Specific examples of the aliphatic dicarboxylic acid include, but are not limited to, a straight-chain aliphatic dicarboxylic acid and a branched-chain aliphatic dicarboxylic acid. Among these compounds, the straight-chain aliphatic dicarboxylic acid is preferable.

Specific examples of the aliphatic dicarboxylic acid include, but are not limited to, an alkanedicarboxylic acid, an alkenyl succinic acid, an alkenedicarboxylic acid, and an alicyclic dicarboxylic acid.

Specific examples of the alkanedicarboxylic acid include, but are not limited to, an alkanedicarboxylic acid having 4 to 36 carbon atoms. Specific examples of the alkanedicarboxylic acid having 4 to 36 carbon atoms include, but are not limited to, succinic acid, adipic acid, sebacic acid, azelaic acid, dodecanedicarboxylic acid, octadecanedicarboxylic acid, and decyl succinic acid.

Specific examples of the alkenyl succinic acid include, but are not limited to, dodecenyl succinic acid, pentadecenyl succinic acid, and octadecenyl succinic acid.

Specific examples of the alkenedicarboxylic acid include, but are not limited to, an alkenedicarboxylic acid having 4 to 36 carbon atoms. Specific examples of the alkenedicarboxylic acid having 4 to 36 carbon atoms include, but are not limited to, maleic acid, fumaric acid, and citraconic acid.

Specific examples of the alicyclic dicarboxylic acid include, but are not limited to, an alicyclic dicarboxylic acid having 6 to 40 carbon atoms. Specific examples of the alicyclic dicarboxylic acid having 6 to 40 carbon atoms include, but are not limited to, dimmer acid (dimerized linoleic acid).

Specific examples of the aromatic dicarboxylic acid include, but are not limited to, an aromatic dicarboxylic acid having 8 to 36 carbon atoms. Specific examples of the aromatic dicarboxylic acid having 8 to 36 carbon atoms include, but are not limited to, phthalic acid, isophthalic acid, t-butyl isophthalic acid, 2,6-naphthalenedicarboxylic acid, and 4,4'-biphenyl dicarboxylic acid.

Specific examples of the polycarboxylic acid having 3 or more valences include, but are not limited to, an aromatic polycarboxylic acid having 9 to 20 carbon atoms such as trimellitic acid and pyromellitic acid.

Specific examples of the dicarboxylic acid and the polycarboxylic acid having 3 or more valences further include an acid anhydride or a C1-C4 alkyl ester of the above-described compounds. Specific examples of the C1-C4 alkyl ester include, but are not limited to, methyl ester, ethyl ester, and isopropyl ester.

Among these dicarboxylic acids, using the aliphatic dicarboxylic acid alone is preferable, and using adipic acid, sebacic acid, dodecanedicarboxylic acid, terephthalic acid, or isophthalic acid alone is more preferable. In addition, a copolymer of the aliphatic dicarboxylic acid and the aromatic dicarboxylic acid is also preferable. Specific examples of the aromatic dicarboxylic acid to be copolymerized include, but are not limited to, terephthalic acid, isophthalic acid, t-butyl isophthalic acid, and an alkyl ester of these aromatic dicarboxylic acids. Specific examples of the alkyl ester include, but are not limited to, methyl ester, ethyl ester, and isopropyl ester. The content of the aromatic dicarboxylic acid in the copolymer is preferably 20% by mol or less.

Preferably, the crystalline segment has an ester bond represented by the following formula to improve low-temperature fixability:

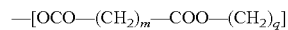

—[OCO—(CH$_2$)$_m$—COO—(CH$_2$)$_q$]

wherein m represents an even number of from 2 to 20, and q represents an even number of from 2 to 20. Preferably, m is within a range from 4 to 10, and q is within a range of from 4 to 10.

The crystalline segment preferably has a melting point of from 50° C. to 85° C. When the melting point is less than 50° C., the crystalline segment is likely to melt at low temperatures, degrading heat-resistant storage stability of the toner. When the melting point exceeds 75° C., the crystalline segment melts insufficiently upon application of heat at the fixing, degrading low-temperature fixability of the toner. When the melting point is within the above range, low-temperature fixability and heat-resistant storage stability improve.

The crystalline segment preferably has a hydroxyl value of from 5 to 40 mgKOH/g.

The crystalline segment preferably has a weight average molecular weight (Mw) of from 3,000 to 30,000, more preferably from 5,000 to 25,000. The weight average molecular weight (Mw) of the crystalline segment can be measured by gel permeation chromatography (GPC).

The crystallinity, molecular structure, etc., of the crystalline segment can be analyzed by means of NMR, DSC, X-ray diffractometry, GC/MS, LC/MS, infrared absorption spectroscopy (IR), etc.

Amorphous Polyester Segment

The amorphous polyester segment is composed of an amorphous polyester resin.

Amorphous Polyester

Specific examples of the amorphous polyester resin include, but are not limited to, a polycondensation polyester resin prepared from a polyol and a polycarboxylic acid. To achieve a good balance between low-temperature fixability and high-humidity resistance, it is preferable that the carboxylic acid monomers include an aromatic dicarboxylic acid and an aliphatic dicarboxylic acid. To achieve a good balance between low-temperature fixability and storage stability, the carboxylic acid monomers include from 5 to 30% by weight of aliphatic dicarboxylic acids.

Polyol

Specific examples of the polyol include, but are not limited to, a divalent diol and a polyol having 3 or more valences.

Specific examples of the divalent diol include, but are not limited to, a divalent aliphatic alcohol such as a straight-chain aliphatic alcohol and a branched-chain aliphatic alcohol. Among these compounds, an aliphatic alcohol having 2 to 36 carbon atoms in the main chain is preferable, and a straight-chain aliphatic alcohol having 2 to 36 carbon atoms in the main chain is more preferable. Two or more of these diols can be used in combination.

Specific examples of the straight-chain aliphatic alcohol include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these alcohols, ethylene glycol, 1,3-propanediol (propylene glycol), 1,4-butanediol, 1,6-hexanediol, 1,9-nonanediol, and 1,10-decanediol are preferable in view of availability. Among these compounds, a straight-chain aliphatic alcohol having 2 to 36 carbon atoms in the main chain is preferable.

Polycarboxylic Acid

Specific examples of the polycarboxylic acid include, but are not limited to, a dicarboxylic acid and a polycarboxylic acid having 3 or more valences. Among these compounds, the dicarboxylic acid is preferable.

Specific examples of the dicarboxylic acid include, but are not limited to, an aliphatic dicarboxylic acid and an aromatic dicarboxylic acid. Specific examples of the aliphatic dicarboxylic acid include, but are not limited to, a straight-chain aliphatic dicarboxylic acid and a branched-chain aliphatic dicarboxylic acid. In particular, a straight-chain aliphatic dicarboxylic acid is preferred.

Specific examples of the aliphatic dicarboxylic acid include, but are not limited to, an alkanedicarboxylic acid, an alkenyl succinic acid, an alkenedicarboxylic acid, and an alicyclic dicarboxylic acid.

Specific examples of the alkanedicarboxylic acid include, but are not limited to, an alkanedicarboxylic acid having 4 to 36 carbon atoms such as succinic acid, adipic acid, sebacic acid, azelaic acid, dodecanedicarboxylic acid, octadecanedicarboxylic acid, and decyl succinic acid.

Specific examples of the alkenyl succinic acid include, but are not limited to, dodecenyl succinic acid, pentadecenyl succinic acid, and octadecenyl succinic acid.

To achieve a good balance between low-temperature fixability and high-humidity resistance, a straight-chain dicarboxylic acid having 2 to 6 carbon atoms is preferably included.

Specific examples of the alkenedicarboxylic acid include, but are not limited to, an alkenedicarboxylic acid having 4 to 36 carbon atoms such as maleic acid, fumaric acid, and citraconic acid.

Specific examples of the alicyclic dicarboxylic acid include, but are not limited to, an alicyclic dicarboxylic acid having 6 to 40 carbon atoms such as dimmer acid (dimerized linoleic acid).

Specific examples of the aromatic dicarboxylic acid include, but are not limited to, an aromatic dicarboxylic acid having 8 to 36 carbon atoms such as phthalic acid, isophthalic acid, t-butyl isophthalic acid, 2,6-naphthalenedicarboxylic acid, and 4,4'-biphenyl dicarboxylic acid.

Specific examples of the polycarboxylic acid having 3 or more valences include, but are not limited to, an aromatic polycarboxylic acid having 9 to 20 carbon atoms such as trimellitic acid and pyromellitic acid.

Specific examples of the dicarboxylic acid and the polycarboxylic acid having 3 or more valences further include an acid anhydride or a C1-C4 alkyl ester of the above-described compounds. Specific examples of the C1-C4 alkyl ester include, but are not limited to, methyl ester, ethyl ester, and isopropyl ester.

The amorphous polyester segment preferably has a glass transition temperature (Tg) of from 50° C. to 70° C. When Tg is less than 50° C., heat-resistant storage stability and resistance to stress, such as that arising from agitation in developing device, of the toner may worsen. When Tg exceeds 70° C., low-temperature fixability may worsen. The glass transition temperature (Tg) of the amorphous polyester segment can be measured by differential scanning calorimetry (DSC). When Tg is within the above range, low-temperature fixability and heat-resistant storage stability improve.

The amorphous polyester segment preferably has a hydroxyl value of from 5 to 40 mgKOH/g.

The amorphous polyester segment preferably has a weight average molecular weight (Mw) of from 3,000 to 30,000, more preferably from 5,000 to 25,000. The weight average molecular weight (Mw) can be measured by gel permeation chromatography (GPC).

The molecular structure of the amorphous polyester segment can be confirmed by means of solution or solid NMR, GC/MS, LC/MS, IR, etc.

Monomers composing the amorphous polyester segment preferably include monomers having an odd number of carbon atoms in the main chain (hereinafter "odd-number type monomers") in an amount of from 1% to 50% by weight, more preferably from 3% to 40% by weight, and most preferably from 5% to 30% by weight. When the content is less than 1% by weight, the odd-number type monomers cannot exert its effect. When the content exceeds 50% by weight, the solubility in a solvent including the odd-number type monomers as constitutional unit may decrease. When the content of the odd-number type monomers is within the above-described range, low-temperature fixability and colorant dispersibility improve.

Production Method of Copolymer

Production method of the copolymer is not limited to any particular method. For example, the copolymer can be produced by the following methods (1) to (3). From the viewpoint of the degree of freedom in molecular design, (1) and (3) are preferable and (1) is more preferable.

(1) A method in which an amorphous polyester segment (amorphous polyester resin) having been prepared by a polymerization reaction and a crystalline segment (crystalline resin) having been prepared by a polymerization reaction are dissolved or dispersed in a solvent and allowed to react with an elongation agent having 2 or more functional groups reactive with terminal hydroxyl or carboxylic group of polymer chain, such as isocyanate group, epoxy group, and carbodiimide group.

(2) A method in which an amorphous polyester segment having been prepared by a polymerization reaction and a crystalline segment having been prepared by a polymerization reaction are melt-kneaded and subjected to an ester exchange reaction under reduced pressures.

(3) A method in which a ring-opening polymerization of an amorphous polyester segment is initiated from a polymer chain terminal of a crystalline segment having been prepared by a polymerization reaction while hydroxyl groups in the crystalline segment act as polymerization initiators.

Specific examples of the elongation agent include, but are not limited to, a polyisocyanate.

Specific examples of the polyisocyanate include, but are not limited to, a diisocyanate such as an aromatic diisocyanate, an aliphatic diisocyanate, an alicyclic diisocyanate, and an aromatic aliphatic diisocyanate.

Specific examples of the aromatic diisocyanate include, but are not limited to, 1,3-phenylene diisocyanate, 1,4-phenylene diisocyanate, 2,4-tolylene diisocyanate (TDI), 2,6-tolylene diisocyanate (TDI), crude TDI, 2,4'-diphenylmethane diisocyanate (MDI), 4,4'-diphenylmethane diisocyanate (MDI), crude MDI, 1,5-naphthylene diisocyanate, 4,4',4''-triphenylmethane triisocyanate, m-isocyanatophenylsulfonyl isocyanate, and p-isocyanatophenylsulfonyl isocyanate.

Specific examples of the aliphatic diisocyanate include, but are not limited to, ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

Specific examples of the alicyclic diisocyanate include, but are not limited to, isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate.

Specific examples of the aromatic aliphatic diisocyanate include, but are not limited to, m-xylylene diisocyanate (XDI), p-xylylene diisocyanate (XDI), and α,α,α',α'-tetramethylxylylene diisocyanate (TMXDI).

In producing the copolymer, the polyisocyanate is used in an amount such that the ratio (OH/NCO) of the total molar number of hydroxyl groups in the crystalline and amorphous polyester segments to that of isocyanate groups in the polyisocyanate becomes from 0.35 to 0.7. When OH/NCO falls below 0.35, the binding force between the amorphous polyester segment and the crystalline segment is so weak that these segments existing freely without binding increase in number. Thus, quality stability cannot be maintained. When OH/NCO exceeds 0.7, the molecular weight of the copolymer and the interaction between the urethane groups exert too strong an influence. In a situation where flowability is required, the toner cannot exert sufficient flowability and deformability.

The weight ratio of the amorphous polyester segment to the crystalline segment in the copolymer is preferably from 1.5 to 4.0. When the weight ratio is less than 1.5, the crystalline segment exerts too strong an influence to destroy the micro phase separation structure specific to the copolymer and form a lamellar structure. In a situation where flowability is required, such as the fixing process, the toner will effectively works. However, in a situation where neither flowability nor deformability is required, such as storage or conveyance process after the fixing process, the molecular motion cannot be restrained. When the weight ratio exceeds 4.0, the amorphous segment may exert too strong an influence. In a situation where neither flowability nor deformability is required, such as the storage or conveyance process after the fixing process, the toner will effectively works. However, in a situation where flowability is required, such as the fixing process, the toner cannot exert sufficient flowability and deformability.

The molar ratio of the crystalline segment to the amorphous polyester segment in the copolymer is preferably from 10/90 to 40/60. When the molar ratio is within the above range, the hardness of the resulting image can recover rapidly, which is advantageous.

The molar numbers of the crystalline segment and the amorphous polyester segments can be determined from the following formula:

$$\text{Molar Number} = [(\text{Weight of Resin (g)}) \times OHV/56.11]/1{,}000$$

wherein OHV represents a hydroxyl value (mgKOH/g).

The content of the copolymer in the binder resin is preferably from 50% to 100% by weight, more preferably from 70% to 100% by weight, and most preferably from 85% to 100% by weight.

Other Components

The toner according to some embodiments of the present invention may further include other components such as a crystalline resin, a colorant, a release agent, a charge controlling agent, and an external additive.

Crystalline Resin

The crystalline resin is generally added as a part of the binder resin. Specific examples of the crystalline resin include the crystalline segment in the copolymer, as described above, but are not limited thereto.

Colorant

Specific examples of the colorant include, but are not limited to, a pigment.

Specific examples of the pigment include, but are not limited to, a black pigment, an yellow pigment, a magenta pigment, and a cyan pigment. Preferably, the toner includes at least one of an yellow pigment, a magenta pigment, and a cyan pigment.

Specific examples of the black pigment include, but are not limited to, carbon black, copper oxide, manganese dioxide, aniline black, activated carbon, non-magnetic ferrite, magnetite, nigrosine dye, and iron black.

Specific examples of the yellow pigment include, but are not limited to, C.I. Pigment Yellow 74, 93, 97, 109, 128, 151, 154, 155, 166, 168, 180, and 185, Naphthol Yellow S, Hansa Yellow (10G, 5G, G), cadmium yellow, yellow iron oxide, yellow ocher, chrome yellow, titanium yellow, and polyazo yellow.

Specific examples of the magenta pigment include, but are not limited to, a quinacridone pigment and a monoazo pigment such as C.I. Pigment Red 48:2, 57:1, 58:2, 5, 31, 146, 147, 150, 176, 184, and 269. The monoazo pigment and the quinacridone pigment can be used in combination.

Specific examples of the cyan pigment include, but are not limited to, Cu-phthalocyanine pigment, Zn-phthalocyanine pigment, and Al-phthalocyanine pigment.

The content of the colorant is preferably from 1 to 15 parts by weight, more preferably from 3 to 10 parts by weight, based on 100 parts of the toner. When the content is less than 1 part by weight, the coloring power of the toner may decrease. When the content exceeds 15 parts by weight, the colorant may be poorly dispersed in the toner, causing deterioration of the coloring power and electric properties of the toner.

The colorant may be combined with a resin to be used as a master batch. Specific examples of the resin to be used for the master batch include, but are not limited to, polymers of styrene or a derivative thereof (e.g., polystyrene, poly-p-chlorostyrene, polyvinyl toluene), styrene-based copolymers (e.g., styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl-α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, styrene-maleate copolymer), polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, terpene resin, aliphatic or alicyclic hydrocarbon resin, aromatic petroleum resin, chlorinated paraffin, and paraffin wax. Two or more of these resins can be used in combination.

The master batch may be obtained by mixing and kneading a resin and a colorant while applying a high shearing force. To increase the interaction between the colorant and the resin, an organic solvent may be used. More specifically, the maser batch may be obtained by a method called flushing in which an aqueous paste of the colorant is mixed and kneaded with the resin and the organic solvent so that the colorant is transferred to the resin side, followed by removal of the organic solvent and moisture. This method is advantageous in that the resulting wet cake of the colorant can be used as it is without being dried. When performing the mixing or kneading, a high shearing force dispersing device such as a three roll mill may be used.

Preferably, the colorant (especially a pigment) exists inside the toner. More preferably, the colorant is dispersed inside the toner. In addition, it is not preferable that the colorant (especially a pigment) exists at the surface of the toner.

Release Agent

Specific examples of the release agent include, but are not limited to, a carbonyl-group-containing wax, a polyolefin wax, and a long-chain hydrocarbon wax. These waxes can be used alone or in combination. Among these waxes, the carbonyl-group-containing wax is preferable.

Specific examples of the carbonyl-group-containing wax include, but are not limited to, a polyalkanoic acid ester, a polyalkanol ester, a polyalkanoic acid amide, a polyalkyl amide, and a dialkyl ketone.

Specific examples of the polyalkanoic acid ester include, but are not limited to, carnauba wax, montan wax, trimethylolpropane tribehenate, pentaerythritol tetrabehenate, pentaerythritol diacetate dibehenate, glycerin tribehenate, and 1,18-octadecanediol distearate.

Specific examples of the polyalkanol ester include, but are not limited to, tristearyl trimellitate and distearyl maleate.

Specific examples of the polyalkanoic acid amide include, but are not limited to, dibehenylamide.

Specific examples of the polyalkyl amide include, but are not limited to, trimellitic acid tristearylamide.

Specific examples of the dialkyl ketone include, but are not limited to, distearyl ketone.

Among these carbonyl-group-containing waxes, the polyalkanoic acid ester is preferable.

Specific examples of the polyolefin wax include, but are not limited to, polyethylene wax and propylene wax.

Specific examples of the long-chain hydrocarbon wax include, but are not limited to, paraffin wax and SASOL wax.

The melting point of the release agent is preferably from 50 to 100° C. and more preferably from 60 to 90° C. Release agents having a melting point less than 50° C. adversely affect heat-resistant storage stability. Release agents having a melting point greater than 100° C. are likely to cause cold offset in low-temperature fixing.

The melting point of the release agent can be measured by a differential scanning calorimeter (such as TA-60WS and DSC-60 from Shimadzu Corporation) as follows. First, about 5.0 mg of the release agent is put in an aluminum sample container. The container is put on a holder unit and set in an electric furnace. In nitrogen atmosphere, the sample is heated from 0° C. to 150° C. at a heating rate of 10° C./min, cooled from 150° C. to 0° C. at a cooling rate of 10° C./min, and reheated to 150° C. at a heating rate of 10° C./min, to obtain a DSC curve. The DSC curve is analyzed with analysis program in DSC-60 to determine a temperature at which the maximum peak of melting heat is observed in the second heating, and the temperature is identified as the melting point.

The melt viscosity at 100° C. of the release agent is preferably from 5 to 100 mPa·sec, more preferably from 5 to 50 mPa·sec, and most preferably from 5 to 20 mPa·sec. When the melt viscosity is less than 5 mPa·sec, releasability may deteriorate. When the melt viscosity is greater than 100 mPa·sec, hot offset resistance and releasability at low temperatures may deteriorate.

The content of the release agent is preferably from 1 to 20 parts by weight, more preferably from 3 to 10 parts by weight, based on 100 parts of the toner. When the content is less than 1 part by weight, hot offset resistance may deteriorate. When the content exceeds 20 parts by weight, heat-resistant storage stability, chargeability, transferability, and resistance to stress may deteriorate.

Charge Controlling Agent

Specific examples of the charge controlling agent include, but are not limited to, nigrosine dyes triphenylmethane dyes, chrome-containing metal complex dyes, chelate pigments of molybdic acid, Rhodamine dyes, alkoxyamines, quaternary ammonium salts (including fluorine-modified quaternary ammonium salts), alkylamides, phosphor and phosphor-containing compounds, tungsten and tungsten-containing compounds, fluorine activators, metal salts of salicylic acid, and metal salts of salicylic acid derivatives. Specific examples of commercially available charge controlling agents include, but are not limited to, BONTRON® 03 (nigrosine dye), BONTRON® P-51 (quaternary ammonium salt), BONTRON® S-34 (metal-containing azo dye), BONTRON® E-82 (metal complex of oxynaphthoic acid), BONTRON® E-84 (metal complex of salicylic acid), and BONTRON® E-89 (phenolic condensation product), which are manufactured by Orient Chemical Industries Co., Ltd.; TP-302 and TP-415 (molybdenum complexes of quaternary ammonium salts), which are manufactured by Hodogaya Chemical Co., Ltd.; LRA-901, and LR-147 (boron complex), which are manufactured by Japan Carlit Co., Ltd.

The content of the charge controlling agent is preferably from 0.01 to 5 parts by weight, more preferably from 0.02 to 2 parts by weight, based on 100 parts of the toner. When the content of the charge controlling agent is less than 0.01 parts by weight, the initial rising of charge and the charge quantity of the toner may be insufficient, adversely affecting the image quality. When the content of the charge controlling agent exceeds 5 parts by weight, the toner charge is so large that the electrostatic attracting force to a developing roller is increased. This may result in decline in developer flowability and image density.

External Additive

Specific examples of the external additive include, but are not limited to, silica, a metal salt of fatty acid, a metal oxide, a hydrophobized titanium oxide, and a fluoropolymer.

Specific examples of the metal salt of fatty acid include, but are not limited to, zinc stearate, and aluminum stearate.

Specific examples of the metal oxide include, but are not limited to, titanium oxide, aluminum oxide, tin oxide, and antimony oxide.

Specific examples of commercially-available silica include, but are not limited to, R972, R974, RX200, RY200, R202, R805, and R812 (from Nippon Aerosil Co., Ltd.).

Specific examples of commercially-available titanium oxide include, but are not limited to, P-25 (from Nippon Aerosil Co., Ltd.); STT-30 and STT-65C-S (from Titan Kogyo, Ltd.); TAF-140 (from Fuji Titanium Industry Co., Ltd.); and MT-150W, MT-500B, MT-600B, and MT-150A (from TAYCA Corporation).

Specific examples of commercially available hydrophobized titanium oxide include, but are not limited to, T-805 (from Nippon Aerosil Co., Ltd.); STT-30A and STT-65S-S (from Titan Kogyo, Ltd.); TAF-500T and TAF-1500T (from Fuji Titanium Industry Co., Ltd.); MT-100S and MT-100T (from TAYCA Corporation); and IT-S (from Ishihara Sangyo Kaisha, Ltd.).

The hydrophobizing treatment can be performed by treating hydrophilic particles with a silane coupling agent such as methyl trimethoxysilane, methyl triethoxysilane, and octyl trimethoxysilane.

The content of the external additive is preferably from 0.1 to 5 parts by weight, more preferably from 0.3 to 3 parts by weight, based on 100 parts of the toner.

The average particle diameter of primary particles of the external additive is preferably 100 nm or less and more preferably from 3 to 70 nm. When the average particle diameter falls below 3 nm, the external additive will be embedded in the toner and its function cannot be effectively exhibited. When the average particle diameter exceeds 100 nm, the external additive will unevenly make flaws on the surface of the photoconductor.

The toner preferably has a volume average particle diameter (Dv) of from 0.1 to 16 μm, more preferably from 0.5 to 11 μm, and most preferably from 1 to 9 μm.

The ratio (Dv/Dn) of the volume average particle diameter (Dv) to the number average particle diameter (Dn) of the toner is preferably from 1.0 to 1.4 and more preferably from 1.0 to 1.3.

The measurement of volume and number average particle diameters (Dv and Dn) can be made with an instrument such as COULTER COUNTER TA-II, COULTER MULTISIZER II, and COULTER MULTISIZER III (from Beckman Coulter, Inc.) in the following manner.

First, from 0.1 to 5 mL of a surfactant (preferably an alkylbenzene sulfonate), as a dispersant, is added to 100 to 150 mL of an electrolyte. Here, the electrolyte is an about 1% NaCl aqueous solution prepared with the first grade sodium chloride, such as ISOTON-II (available from Beckman Coulter, Inc.). Further, 2 to 20 mg of a sample is added thereto. The electrolyte, in which the sample is suspended, is subjected to a dispersion treatment with an ultrasonic disperser for about 1 to 3 minutes and then to the measurement of the volume and number of toner particles with the above instrument and a 100-μm aperture to calculate volume and number distributions. Further, the volume average particle diameter (Dv) and number average particle diameter (Dn) are calculated from the volume and number distributions.

Thirteen channels with the following ranges are used for the measurement: not less than 2.00 μm and less than 2.52 μm; not less than 2.52 μm and less than 3.17 μm; not less than 3.17 μm and less than 4.00 μm; not less than 4.00 μm and less than 5.04 μm; not less than 5.04 μm and less than 6.35 μm; not less than 6.35 μm and less than 8.00 μm; not less than 8.00 μm and less than 10.08 μm; not less than 10.08 μm and less than 12.70 μm; not less than 12.70 μm and less than 16.00 μm; not less than 16.00 μm and less than 20.20 μm; not less than 20.20 μm and less than 25.40 μm; not less than 25.40 μm and less than 32.00 μm; and not less than 32.00 μm and less than 40.30 μm. Namely, particles having a particle diameter not less than 2.00 μm and less than 40.30 μm are to be measured.

Properties Determined by Large Amplitude Oscillatory Shear (LAOS) Method

In a situation where flowability is required, such as the fixing process, the toner is required to have sufficient mobility, whereas in a situation where flowability is not required, such as the conveyance process, it is preferable that the mobility is restrained.

The inventors of the present invention observe the restrained mobility in terms of rheology with respect to the process in which the toner is cooled after being fixed. In a process in which a melt body is cooled and solidified, a large strain is given at a large strain rate. Therefore, the restrained mobility cannot be characterized in terms of conventional equilibrium structure and linear viscoelasticity, and should be discussed with non-linear viscoelasticity under a large deformation condition. Under a large deformation condition, the rheology can be evaluated by a method applying shearing strain or another method applying unaxial elongation strain. For the above-described process to be observed, the method applying shearing strain is suitable. In particular, a LAOS method is preferable which can divide a stress value corresponding to a strain into an elastic stress and a viscous stress.

The inventors of the present invention have found that the maximum elastic stress (hereinafter "ES100") measured at 100° C. by the LAOS method can be treated as a value assuming the fixing process, in solving problems caused in the image forming process. In addition, the maximum elastic stress (hereinafter "ES70") measured at 70° C. after the temperature is decreased from 100° C. to 70° C. can be treated as a value assuming the conveyance process immediately after the fixing process.

The binder resin has an ES100, assuming the fixing process, of 1,000 Pa or less. When ES100 exceeds 1,000 Pa, the binder resin will lose its feature of rapidly absorbing external force and flexibly deforming in accordance with the shape of the material to be fixed, which is an essential feature for low-temperature fixing.

The binder resin has an ES70, assuming the conveyance process immediately after the fixing process, of 1,000 Pa or more. When ES70 is less than 1,000 Pa, the binder resin will immediately self-aggregate after being melted without restraining the mobility. Therefore, the binder resin cannot resist an external force (e.g., compressive shear, detachment) generated in the conveyance process.

The binder resin preferably has an ES100 of from 1 to 500 Pa and more preferably from 1 to 100 Pa. When ES100 is within the above range, it is advantageous in terms of low-temperature fixability.

The binder resin preferably has an ES70 of from 2,000 to 200,000 and more preferably from 3,000 to 200,000 Pa. When ES70 is within the above range, it is advantageous in terms of abrasion resistance in paper ejection.

The toner has an ES100, assuming the fixing process, of 3,000 Pa or less. When ES100 exceeds 3,000 Pa, the toner will lose its feature of rapidly absorbing external force and flexibly deforming in accordance with the shape of the material to be fixed, which is an essential feature for low-temperature fixing.

The toner has an ES70, assuming the conveyance process immediately after the fixing process, of 5,000 Pa or more. When ES70 is less than 5,000 Pa, the toner will immediately self-aggregate after being melted without restraining the mobility. Therefore, the toner cannot resist an external force (e.g., compressive shear, detachment) generated in the conveyance process.

The toner preferably has an ES100 of from 1 to 3,000 Pa and more preferably from 1 to 2,000 Pa. When ES100 is within the above range, it is advantageous in terms of low-temperature fixability. The toner preferably has an ES70 of from 5,000 to 200,000 and more preferably from 10,000 to 20,000 Pa. When ES70 is within the above range, it is advantageous in terms of abrasion resistance in paper ejection.

Measurement Based on LAOS Method

A measurement based on the LAOS method can be performed with an instrument ARES-G2 (from TA Instruments Japan Inc.) in the following manner.

A measurement sample is prepared by compressing 0.2 g of a toner or binder resin with a pressure of 25 MPa using a compression molding machine to form it into a pellet having a diameter of 1.0 mm. The pellet is placed between aluminum disposable parallel plates having a diameter of 8 mm and heated to 130° C. to cause plasticization. The pellet is then compressed to the extent that the gap between the parallel plates becomes a predetermined value. The melted body protruding from the plate geometry is removed with a brass spatula. The measurement gap is set to 2 mm, the frequency is set to 1 rad/sec, and the amount of strain is set to from 1.0% to 200%. The measurement temperature is 100° C. and 70° C. The sample is first subjected to the measurement at 100° C., then air-cooled to 70° C., and subjected to the measurement at 70° C.

Properties Determined by Pulse NMR

In accordance with some embodiments of the present invention, the inventors of the present invention have discovered a technique of chemically binding a crystalline segment and an amorphous polyester segment together and controlling the structure of each segment to restrain the molecular motion of the crystalline segment.

Pulsed nuclear magnetic resonance (hereinafter "pulsed NMR") is an effective measure for scaling molecular mobility. Unlike high-resolution NMR that provides chemical shift information (e.g., local chemical structure), pulsed NMR rapidly determines the relaxation times (i.e., spin-lattice relaxation time (T1) and spin-spin relaxation time (T2)) of 1H nuclear, having a close relation to molecular mobility. In recent years, pulsed NMR have been in wide spread use. Preferred measurement methods for pulsed NMR include, but are not limited to, Hahn echo method, solid echo method, CPMG method (i.e., Carr-Purcell-Meiboom-Gill method), and 90° pulse method. At temperatures of 70° C. and 130° C., the toner according to some embodiments of the present invention has a moderate spin-spin relaxation time (T2), and therefore Hahn echo method is suitable. At a temperature of 50° C. in the process of temperature rising, the toner has a relatively short relaxation time, and therefore solid echo method is suitable. Generally, solid echo method and 90° pulse method are suitable for measuring a short T2, Hahn echo method is suitable for measuring a moderate T2, and CPMG method is suitable for measuring a long T2.

In the present disclosure, a spin-spin relaxation time at 50° C. (t50) is preferably used as a scale for molecular mobility in relation to storage stability. A spin-spin relaxation time at 130° C. (t130) is preferably used as a scale for molecular mobility at the time of fixing. A spin-spin relaxation time at 70° C. (t'70) after being cooled from 130° C. to 70° C. is preferably used as a scale for molecular mobility in relation to rub resistance of the image at the time of conveyance of the image.

When the spin-spin relaxation times are within a predetermined range, in a situation where flowability is required, such as the fixing process, the mobility is sufficiently provided, whereas in a situation where flowability is not required, such as the conveyance process, the mobility is restrained.

The binder resin preferably has a t50, serving as a scale for molecular mobility in relation to storage stability, of 1.0 msec or less. When t50 exceeds 1.0 msec, it means that the toner mobility at 50° C. is so high that deformation or aggregation is caused by an external force. The toner may have a difficulty in overseas transportation or storage during summer or by ship.

The binder resin preferably has a t130, serving as a scale for molecular mobility at the time of fixing, of 8.0 msec or more. When t130 falls below 8.0 msec, it means that the molecular mobility upon application of heat is insufficient, decreasing fluidity and deformability of the toner. As a result, image ductility and image connectivity to print objective may deteriorate, causing image deterioration such as gloss decline or image detachment.

The binder resin preferably has a t'70, serving as a scale for molecular mobility in relation to rub resistance of the image at the time of conveyance of the image, of 1.5 msec or less. When t'70 exceeds 1.5 msec, the image is brought into contact or rubbing with a roller or conveyance member in the paper ejection process after the fixing process before the molecular motion is sufficiently restrained, making scratches on the image and reducing the gloss of the image.

More preferably, the binder resin has a t50 of from 0.001 to 0.7 msec. When t50 is within the above range, it is advantageous in terms of heat-resistant storage stability, and the production of white-spotted image, caused due to the occurrence of toner aggregation, can be prevented.

More preferably, the binder resin has a t130 of from 8.0 to 30 msec. When t130 is within the above range, it is advantageous in terms of low-temperature fixability.

More preferably, the binder resin has a t'70 of from 0.05 to 1.5 msec. When t'70 is within the above range, it is advantageous in terms of abrasion resistance in paper ejection.

The toner preferably has a t50, serving as a scale for molecular mobility in relation to storage stability, of 1.0 msec or less. When t50 exceeds 1.0 msec, it means that the toner mobility at 50° C. is so high that deformation or aggregation is caused by an external force. The toner may have a difficulty in overseas transportation or storage during summer or by ship.

The toner preferably has a t130, serving as a scale for molecular mobility at the time of fixing, of 8.0 msec or more. When t130 falls below 8.0 msec, it means that the molecular mobility upon application of heat is insufficient, decreasing fluidity and deformability of the toner. As a result, image ductility and image connectivity to print objective may deteriorate, causing image deterioration such as gloss decline or image detachment.

The toner preferably has a t'70, serving as a scale for molecular mobility in relation to rub resistance of the image at the time of conveyance of the image, of 2.0 msec or less. When t'70 exceeds 2.0 msec, the image is brought into contact or rubbing with a roller or conveyance member in the paper ejection process after the fixing process before the molecular motion is sufficiently restrained, making scratches on the image and reducing the gloss of the image.

More preferably, the toner has a t50 of from 0.001 to 0.7 msec. When t50 is within the above range, it is advantageous in terms of heat-resistant storage stability, and the production of white-spotted image, caused due to the occurrence of toner aggregation, can be prevented.

More preferably, the toner has a t130 of from 8.0 to 30 msec. When t130 is within the above range, it is advantageous in terms of low-temperature fixability.

More preferably, the toner has a t'70 of from 0.05 to 1.5 msec. When t'70 is within the above range, it is advantageous in terms of abrasion resistance in paper ejection.

Measurement with Pulsed NMR

A measurement can be performed with an instrument Minispec-MQ20 from Bruker Optics K.K. in the following manner.

An attenuation curve is measured with a pulse sequence (90° x-Pi-180° x) according to Hahn echo method while setting the observing nuclear to 1H, resonant frequency to 19.65 MHz, and measurement interval to 5 sec. Pi ranges from 0.01 to 100 ms, the number of data points is 100, the cumulated number is 32, and the measurement temperature is changed to 50° C., 130° C., and 70° C. in this order.

A sample tube is filled with 0.2 g of the toner powder or the binder resin powder and adequately exposed to a magnetic field for the measurement. In the measurement, t50, t130, and t'70 are measured.

Properties Determined by Atomic Force Microscope (AFM)

When the binder resin is observed with an atomic force microscope (AFM) in tapping mode to obtain a phase image and the phase image is binarized by using an intermediate value between maximum and minimum phase difference values to obtain a binarized image, the binarized image consists of first phase-contrast images serving as large-phase-difference portions and second phase-contrast images serving as small-phase-difference portions with the first phase-contrast images dispersed in the second phase-contrast images forming a dot-like or streaky structure. The average value of the dispersion diameters, corresponding to the maximum Feret diameters, of the first phase-contrast images in the dot-like structure, or the widths, corresponding to the minimum Feret diameters, of the first phase-contrast images in the streaky structure, is 100 nm or less, more preferably from 10 to 100 nm. When the average dispersion diameter exceeds 100 nm, adhesive units are likely to expose at the toner surface upon application of stress, which may decrease resistance to toner filming. When the average dispersion diameter is less than 10 nm, the degree of stress relaxation significantly lowers, which may be ineffective for improving toughness. More preferably, the average dispersion diameter is from 10 to 45 nm.

When the toner is observed with an atomic force microscope (AFM) in tapping mode to obtain a phase image and the phase image is binarized by using an intermediate value between maximum and minimum phase difference values to obtain a binarized image, the binarized image consists of first phase-contrast images serving as large-phase-difference portions and second phase-contrast images serving as small-phase-difference portions with the first phase-contrast images dispersed in the second phase-contrast images. The average value of the dispersion diameters, corresponding to the maximum Feret diameters, of the first phase-contrast images is 100 nm or less, more preferably from 10 to 100 nm, and most preferably from 20 to 60 nm.

In a case in which small-phase-difference portions become continuous with each other in the form of a line and no boundary is detected, the width of the line is 100 nm or less.

The structure in which the first phase-contrast images are dispersed in the second phase-contrast images is defined as a structure in which the boundary between the domains of the first and the second phase-contrast images and the Feret diameters of the first phase-contrast images can be defined. When the first phase-contrast images are too finely dispersed to be indistinguishable from image noise or a Feret diameter cannot be clearly determined, it is confirmed that the dispersed structure is not established. When the first phase-contrast images are indistinguishable from image noise and a boundary cannot be determined between the domains of the first and the second phase-contrast images, it is impossible to determine Feret diameters.

When the domains of the first phase-contrast images are streaky and the maximum Feret diameter of each domain account for 300 nm or more, the minimum Feret diameter of each domain is employed as the domain diameter in place of the maximum Feret diameter.

In order to improve the toughness of the binder resin, a structure capable of relaxing external deformation or pressure should be introduced to the inside of the binder resin. One example of such a structure involves a structure with a higher softness. However, introduction of the softer structure will cause blocking such that toner particles fuse with each other when stored. In addition, the resulting image may have damage or fouling arising from the softness of the structure. To achieve a good balance between toughness and relaxing property, the above problem should be solved.

To balance two opposite properties of toughness and relaxing property, the first phase-contrast images serving as large-phase-difference portions, capable of effectively acting on stress relaxation to improve toughness of the binder resin, are made finely dispersed in the second phase-contrast image serving as small-phase-difference portions.

Observation with AFM

The internal dispersion state of the toner or binder resin can be confirmed from its phase image obtained with an atomic force microscope (AFM) in tapping mode. The detailed procedure for the measurement with AFM in tapping mode is described in Surface Science Letter, 290, 668 (1993). In the measurement, the surface profile of a sample is measured while vibrating a cantilever, as described in Polymer, 35, 5778 (1994) and Macromolecules, 28, 6773, (1995). Due to the viscoelastic property of the sample surface, a phase difference generates between a drive for vibrating the cantilever and the actual vibration. By mapping such phase differences, a phase image is obtainable. In soft portions, a phase delay is observed to be large. In hard portions, a phase delay is observed to be small.

Preferably, the toner or binder resin has a structure such that soft portions observed as large-phase-difference images are finely dispersed in hard portions observed as small-phase-difference images. More preferably, the toner or binder resin has a structure such that the second phase-contrast images serving as hard and small-phase-difference images constitute the outer phase and the first phase-contrast images serving as soft and large-phase-difference images constitute the inner phase with the first phase-contrast images finely dispersed in the second phase-contrast images.

In Examples described later, the AFM measurement is performed in the following manner.

A sample for the AFM observation for obtaining phase images can be prepared by, for example, cutting the toner or binder resin block into sections with ultramicrotome ULTRACUT UCT from Leica under the following conditions.

Cutting thickness: 60 nm
Cutting speed: 0.4 mm/sec
Knife: Diamond knife (Ultra Sonic 35°)

The AFM phase image can be obtained with, for example, an instrument MFP-3D from Asylum Research and a cantilever OMCL-AC240TS-C3 under the following conditions.

Target amplitude: 0.5 V
Target percent: −5%
Amplitude setpoint: 315 mV
Scan rate: 1 Hz
Scan points: 256×256
Scan angle: 0°

Figure 3:
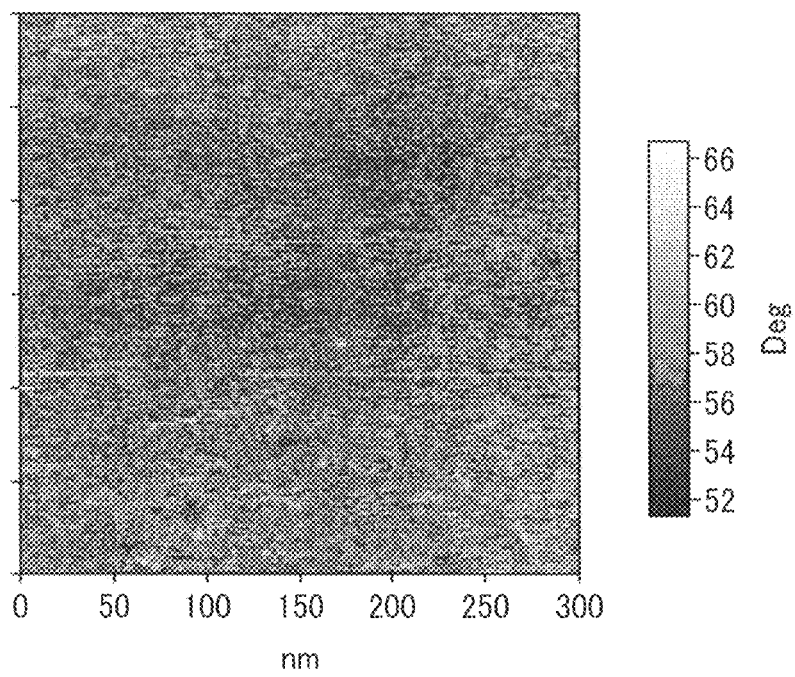
FIG. 3 is an example of an image which is difficult to determine whether it is an image noise or a phase image.

To determine the maximum Feret diameters of the first phase-contrast images (i.e., soft units), the sample should be first observed with AFM in tapping mode to obtain a phase image and then the phase image should be binarized by using an intermediate value between maximum and minimum phase difference values to obtain a binarized image. The phase image is photographed in such a way that the small-phase-difference portions are represented by dark colors while the large-phase-difference portions are represented by light colors. The phase image is then binarized by using an intermediate value between maximum and minimum phase difference values. Ten randomly-selected 300-nm-square phase images are subjected to the binarization processing. The maximum Feret diameters of the first phase-contrast images in the dot-like structure or the minimum Feret diameters of the first phase-contrast images in the streaky structure in each of the ten binarized images are measured, and the measured values are averaged. If the obtained image is an obvious image noise or is indistinguishable from image noise, as shown in FIG. 3, such image is excluded from the calculation of the average value. More specifically, among the first phase-contrast images, those having an area of one-hundredth or less of the area of the first phase-contrast image having the largest maximum Feret diameter in the same phase image are excluded from the calculation of the average value. The maximum Feret diameter is defined as the greatest distance between two parallel lines sandwiching the first phase-contrast image.

Figure 2:
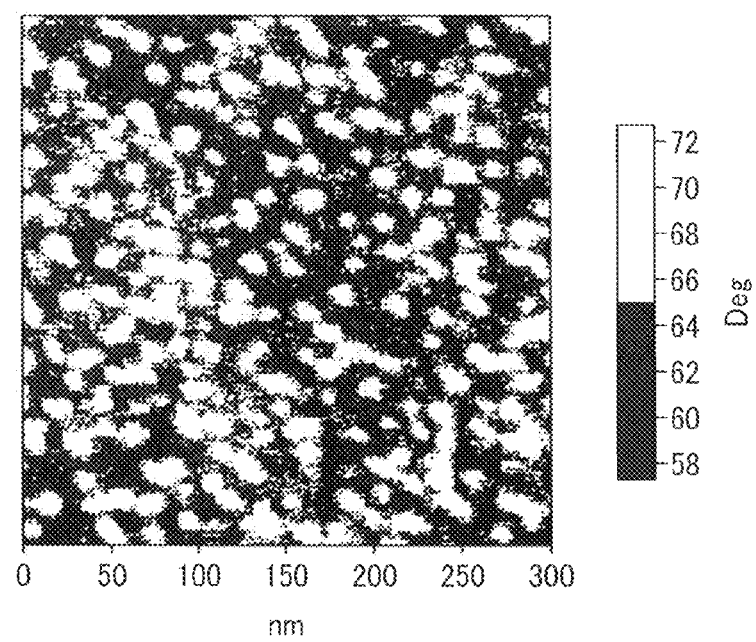
FIG. 2 is a binarized image of the phase image of FIG. 1.

FIG. 1 is an example of a phase image of a toner including the copolymer. FIG. 2 is a binarized image of the phase image of FIG. 1. Referring to FIG. 2, the bright regions represent the first phase-contrast images serving as large-phase-difference portions and the dark regions represent the second phase-contrast images consisting of small-phase-difference portions.

Weight Average Molecular Weight (Mw) of Copolymer

The copolymer preferably has a weight average molecular weight (Mw) of from 20,000 to 150,000 to achieve a balance between low-temperature fixability and heat-resistant storage stability.

When Mw is less than 20,000, heat-resistant storage stability of the toner may deteriorate, and further hot offset resistance may deteriorate. When Mw exceeds 150,000, it is likely that the toner cannot melt sufficiently at low temperatures and the resulting image is easily detachable, causing deterioration of low-temperature fixability.

Mw can be measured with a gel permeation chromatographic instrument (such as HLC-8220 GPC from Tohsoh Corporation). Triplet of 15-cm column TSKgel Super HZM-H is preferably used. First, a 0.15% by weight tetrahydrofuran (THF, containing a stabilizer, from Wako Pure Chemical Industries, Ltd.) solution of a sample resin is prepared. The solution is filtered with 0.2-μm filter, and the filtrate is used as a specimen in succeeding procedures. Next, 100 μL of the specimen are injected into the instrument and subjected to a measurement at 40° C. and a flow rate of 0.35 mL/min.

A molecular weight is determined with reference to a calibration curve compiled from monodisperse polystyrene standard samples. As the polystyrene standard samples, Showdex STANDARD series from Showa Denko K.K. and toluene can be used. Three kinds of THF solutions A, B, and C of monodisperse polystyrene standard samples having the following compositions are prepared and subjected to the measurement under the above-described conditions. A calibration curve is compiled with light-scattering molecular weights of the monodisperse polystyrene standard samples that are represented by retention time for the peaks.

Solution A: 2.5 mg of S-7450, 2.5 mg of S-678, 2.5 mg of S-46.5, 2.5 mg of S-2.90, and 50 mL of THF Solution B: 2.5 mg of S-3730, 2.5 mg of S-257, 2.5 mg of S-19.8, 2.5 mg of S-0.580, and 50 mL of THF Solution C: 2.5 mg of S-1470, 2.5 mg of S-112, 2.5 mg of S-6.93, 2.5 mg of toluene, and 50 mL of THF As the detector, a refractive index (RI) detector is used.

Production Method of Toner

In accordance with some embodiments of the present invention, the toner may be produced by, for example, a wet granulation method and a pulverization method. Specific examples of the wet granulation method include, but are not limited to, a dissolution suspension method and an emulsion aggregation method. The dissolution suspension method and emulsion aggregation method are preferable because these methods do not include the process of kneading the binder resin, which is free from the problem of molecular cut caused by kneading or the difficulty of uniformly kneading high-molecular-weight resin with low-molecular-weight resin. The dissolution suspension method is more preferable in terms of uniformity of the binder resin in the toner particles.

The toner can also be produced by a method of producing particles described in Japanese Patent No. 4531076. The method includes the processes of dissolving toner constituents in a liquid or supercritical carbon dioxide and removing the liquid or supercritical carbon dioxide to obtain toner particles.

Dissolution Suspension Method

The dissolution suspension method includes a process of preparing toner material phase, a process of preparing aqueous medium phase, a process of preparing emulsion or dispersion liquid, and a process of removing organic solvent, and optionally includes other processes, if necessary.

Process of Preparing Toner Material Phase (Oily Phase)

In the process of preparing toner material phase, toner materials including at least a binder resin and optionally a colorant and a release agent are dissolved or dispersed in an organic solvent to prepare a solution or dispersion liquid of the toner materials (hereinafter "toner material phase" or "oily phase").

Preferably, the organic solvent is a volatile solvent having a boiling point of less than 150° C., which is easily removable. Specific examples of such organic solvent include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. Among these solvents, ethyl acetate, toluene, xylene, benzene, methylene chloride, 1,2-dichloroethane, chloroform, and carbon tetraoxide are preferable, and ethyl acetate is most preferable. Two or more of these solvents can be used in combination.

The content of the organic solvent is preferably from 0 to 300 parts by weight, more preferably from 0 to 100 parts by weight, and most preferably from 25 to 70 parts by weight, based on 100 parts of the toner materials.

Process of Preparing Aqueous Medium Phase (Aqueous Phase)

In the process of preparing aqueous medium phase, an aqueous medium phase is prepared by containing fine resin particles in an aqueous medium.

Specific examples of the aqueous medium include, but are not limited to, water, a water-miscible solvent, and a mixture thereof. Among these aqueous media, water is preferable.

Specific examples of the water-miscible solvent include, but are not limited to, an alcohol, dimethylformamide, tetrahydrofuran, a cellosolve, and a lower ketone. Specific examples of the alcohol include, but are not limited to, methanol, isopropanol, and ethylene glycol. Specific examples of the lower ketone include, but are not limited to, acetone and methyl ethyl ketone.

Two or more of these aqueous media can be used in combination.

The aqueous medium phase is prepared by dispersing fine resin particles in an aqueous medium in the presence of a surfactant. The reason for adding the surfactant and fine resin particles in the aqueous medium is to improve dispersibility of toner materials.

The amount of each of the surfactant and fine resin particles to be added to the aqueous medium is preferably from 0.5% to 10% by weight based on the aqueous medium.

Specific examples of the surfactant include, but are not limited to, an anionic surfactant, a cationic surfactant, and an ampholytic surfactant.

Specific examples of the anionic surfactant include, but are not limited to, fatty acid salt, alkyl sulfate, alkyl aryl sulfonate, alkyl diaryl ether disulfonate, dialkyl sulfosuccinate, alkyl phosphate, naphthalene sulfonic acid formalin condensate, polyoxyethylene alkyl phosphate, and glyceryl borate fatty acid ester.

The fine resin particles are not limited in material so long as an aqueous dispersion thereof is obtainable. Usable resins include both thermoplastic resins and thermosetting resins. Specific examples of resins usable for the fine resin particles include, but are not limited to, vinyl resin, polyurethane resin, epoxy resin, polyester resin, polyamide resin, polyimide resin, silicone resin, phenol resin, melamine resin, urea resin, aniline resin, ionomer resin, and polycarbonate resin. Two or more of these resins can be used in combination.

Among these resins, vinyl resin, polyurethane resin, epoxy resin, polyester resin, and combinations thereof are preferable because aqueous dispersions of fine spherical particles thereof are easily obtainable.

Specific examples of the vinyl resin include, but are not limited to, homopolymers and copolymers of vinyl monomers, such as styrene-acrylate copolymer, styrene-methacrylate copolymer, styrene-butadiene copolymer, acrylic acid-acrylate copolymer, methacrylic acid-acrylate copolymer, styrene-acrylonitrile copolymer, styrene-maleic anhydride copolymer, styrene-acrylic acid copolymer, and styrene-methacrylic acid copolymer.

The fine resin particles preferably have an average particle diameter of from 5 to 200 nm and more preferably from 20 to 300 nm.

In preparing the aqueous medium phase, cellulose can be used as a dispersant. Specific examples of the cellulose include, but are not limited to, methyl cellulose, hydroxyethyl cellulose, hydroxypropyl cellulose, and carboxymethylcellulose sodium.

Process of Preparing Emulsion or Dispersion Liquid

In the process of preparing emulsion or dispersion liquid, the solution or dispersion liquid of the toner materials (i.e., the toner material phase) is mixed with the aqueous medium phase, in other words, the toner material phase is emulsified or dispersed in the aqueous medium phase, to prepare an emulsion or dispersion liquid.

The emulsification or dispersion process can be performed with a known disperser. Specific examples of the disperser include, but are not limited to, a low-speed shearing disperser and a high-speed shearing disperser.

The used amount of the aqueous medium phase is preferably from 50 to 2,000 parts by weight, more preferably from 100 to 1,000 parts by weight, based on 100 parts by weight of the toner materials. When the used amount is less than 50 parts by weight, the dispersion state of the toner material phase is poor and toner particles having a desired particle size cannot be obtained. When the used amount exceeds 2,000 parts by weight, it is not economical.

Process of Removing Organic Solvent

In the process of removing organic solvent, the organic solvent is removed from the emulsion or dispersion liquid to obtain a solvent-free slurry.

The organic solvent can be removed by (1) gradually heating the whole reaction system to completely evaporate the organic solvent from oil droplets in the emulsion or dispersion liquid or (2) spraying the emulsion or dispersion liquid into a dry atmosphere to completely evaporate the organic solvent from oil droplets in the emulsion or dispersion liquid.

Toner particles are formed upon removal of the organic solvent.

Other Processes

The other processes may include, for example, a washing process and a drying process.

Washing Process

The washing process comes after the process of removing organic solvent. In the washing process, the solvent-free slurry is washed with water. Specific examples of the water include, but are not limited to, ion-exchange water.

Drying Process

In the drying process, toner particles obtained in the washing process are dried.

Pulverization Method

The pulverization method produces mother toner particles through the processes of melt-kneading toner materials including at least a binder resin, pulverizing the kneaded product, and classifying the pulverized product.

In the melt-kneading process, a mixture of the toner materials is melt-kneaded by a melt-kneader. Specific examples of the melt-kneader include, but are not limited to, a single-axis or double-axis continuous kneader and a batch kneader using roll mill. Specific examples of commercially available kneaders include, but are not limited to, TWIN SCREW EXTRUDER KTK from Kobe Steel, Ltd., TWIN SCREW COMPOUNDER TEM from Toshiba Machine Co., Ltd., MIRACLE K.C.K from Asada Iron Works Co., Ltd., TWIN SCREW EXTRUDER PCM from Ikegai Co., Ltd., and KOKNEADER from Buss Corporation. The melt-kneading process should be performed under the condition that the molecular chains of the binder resin are not cut. In particular, the melt-kneading temperature should be determined in view of the softening point of the binder resin. When the melt-kneading temperature is too higher than the softening point of the binder resin, the molecular chains are cut significantly. When the melt-kneading temperature is too lower than the softening point of the binder resin, dispersion will not well advance.

In the pulverizing process, the melt-kneaded product is pulverized. In particular, preferably, the melt-kneaded product is first coarsely pulverized and then finely pulverized. Specific examples of the pulverization method include, but are not limited to, a method in which particles are brought into collision with a collision plate in jet stream; a method in which particles are brought into collision with each other; and a method in which particles are put in a narrow gap between mechanically-rotating rotor and stator.

In the classifying process, the pulverized product is adjusted to have a predetermined particle diameter. In the classifying process, ultrafine particles are removed by means of cyclone separator, decantation, or centrifugal separator.

Developer

In accordance with some embodiments of the invention, a developer is provided. The developer includes the above toner according to some embodiments of the present invention. The developer may be either a one-component developer or a two-component developer including a carrier. For use in high-speed printers corresponding to recent improvement in information processing speed, the two-component developer is preferable because of its extended useful lifespan.

In the one-component developer according to some embodiments of the present invention, the average toner size may not vary very much although consumption and supply of toner particles are repeated. Additionally, the toner particles are prevented from filming a developing roller (developer bearing member) or adhering to a toner layer regulating member (blade). Thus, stable developability and image are provided for an extended period of time.

In the two-component developer according to some embodiments of the present invention, the average toner size may not vary very much although consumption and supply of toner particles are repeated over a long period. Thus, stable developability is provided for an extended period of time.

Carrier

The carrier is not limited in composition. Preferably, the carrier is composed of a core material and a resin layer covering the core material.

Core Material

The core material is composed of a magnetic particle such as ferrite, magnetite, iron, and nickel. With respect to ferrites, considering recent increasing attention to environmental applicability, manganese ferrite, manganese-magnesium ferrite, manganese-strontium ferrite, manganese-magnesium-strontium ferrite, and lithium ferrite are preferred rather than copper-zinc ferrite that has been conventionally used.

Resin Layer

Specific examples of resins usable for the resin layer include, but are not limited to, amino resin, polyvinyl resin, polystyrene resin, halogenated olefin resin, polyester resin, polycarbonate resin, polyethylene resin, polyvinyl fluoride resin, polyvinylidene fluoride resin, polytrifluoroethylene resin, polyhexafluoropropylene resin, copolymer of vinylidene fluoride with an acrylic monomer, copolymer of vinylidene fluoride with vinyl fluoride, fluoroterpolymer (e.g., terpolymer of tetrafluoroethylene, vinylidene fluoride, and non-fluoride monomer), and silicone resin. Two or more of these resins can be used in combination.

Specific examples of the silicone resin include, but are not limited to, a straight silicone resin consisting of organosiloxane bonds only; and a modified silicone resin modified with an alkyd, polyester, epoxy, acrylic resin, or urethane resin.

Commercially-available products can be used as the silicone resin.

Specific examples of the straight silicone resin include, but are not limited to, KR271, KR255, and KR152 (from Shin-Etsu Chemical Co., Ltd.); and SR2400, SR2406, and SR2410 (from Dow Corning Toray Co., Ltd.).

Specific examples of the modified silicone resin include, but are not limited to, KR-206 (alkyd-modified silicone resin), KR-5208 (acrylic-modified silicone resin), ES-1001N (epoxy-modified silicone resin), and KR-305 (urethane-modified silicone resin), each available from Shin-Etsu Chemical Co., Ltd.); and SR2115 (epoxy-modified silicone resin) and SR2110 (alkyd-modified silicone resin), each available from Dow Corning Toray Co., Ltd.).

These silicone resins can be used alone or in combination with cross-linking components, charge controlling components, etc.

The content of the resin layer in the carrier is preferably from 0.01% to 5.0% by weight. When the content is less than 0.01% by weight, a uniform resin layer cannot be formed on the surface of the core material. When the content exceeds 5.0% by weight, the resulting resin layer may become too thick to cause carrier particles to adhere to each other, and uniform carrier particles cannot be obtained.

The content of the toner in the two-component developer is preferably from 2.0 to 12.0 parts by weight, more preferably from 2.5 to 10.0 parts by weight, based on 100 parts by weight of the carrier.

Image Forming Apparatus and Image Forming Method

The image forming apparatus according to some embodiments of the present invention includes at least an electrostatic latent image bearer (hereinafter maybe referred to as "photoconductor"), an electrostatic latent image forming device, and a developing device, and optionally other devices, if necessary.

The image forming method according to some embodiments of the present invention includes at least an electrostatic latent image forming process and a developing process, and optionally other processes, if necessary.

The image forming method is preferably performed by the image forming apparatus. The electrostatic latent image forming process is preferably performed by the electrostatic latent image forming device. The developing process is preferably performed by the developing device. The other processes are preferably performed by the other devices.

Electrostatic Latent Image Bearer

The electrostatic latent image bearer is not limited in material, structure, and size. Specific examples of usable materials include, but are not limited to, inorganic photoconductors such as amorphous silicon and selenium and organic photoconductors such as polysilane and phthalopolymethine. Among these materials, amorphous silicon is preferable in terms of long operating life.

An amorphous silicon photoconductor can be prepared by, for example, heating a support to from 50° C. to 400° C. and forming a photoconductive layer composed of amorphous silicon on the support by means of vacuum evaporation, sputtering, ion plating, thermal CVD (Chemical Vapor Deposition), optical CVD, or plasma CVD. In particular, plasma CVD, which forms an amorphous silicon film on the support by decomposing a raw material gas by a direct-current, high-frequency, or micro-wave glow discharge, is preferable.

The electrostatic latent image bearer is not limited in shape but preferably in the form of a cylinder. The electrostatic latent image bearer in the form of a cylinder preferably has an outer diameter of from 3 to 100 mm, more preferably from 5 to 50 mm, and most preferably from 10 to 30 mm.

Electrostatic Latent Image Forming Device and Electrostatic Latent Image Forming Process The electrostatic latent image forming device is not limited in configuration so long as it forms an electrostatic latent image on the electrostatic latent image bearer. The electrostatic latent image forming device may include at least a charger to charge a surface of the electrostatic latent image bearer and an irradiator to irradiate the surface of the electrostatic latent image bearer with light containing image information.

The electrostatic latent image forming process is a process in which an electrostatic latent image is formed on the electrostatic latent image bearer. The electrostatic latent image forming process can be performed by, for example, charging a surface of the electrostatic latent image bearer and irradiating the surface with light containing image information. The electrostatic latent image forming process can be performed by the electrostatic latent image forming device.

Charger and Charging Process

Specific examples of the charger include, but are not limited to, a contact charger equipped with a conductive or semiconductive roller, brush, film, or rubber blade, and a non-contact charger employing corona discharge such as corotron and scorotron.

In the charging process, the charger charges a surface of the electrostatic latent image bearer by applying a voltage thereto.

The shape of the charger is determined in accordance with the specification or configuration of the image forming apparatus, and may be in the form of a roller, a magnetic brush, a fur brush, etc.

When the charger is in the form of a magnetic brush, the magnetic brush can be composed of ferrite particles (e.g., Zn—Cu ferrite) as charging members, a non-magnetic conductive sleeve that supports the ferrite particles, and a magnet roll contained therein.

When the charger is in the form of a fur brush, the fur brush can be composed of a fur having been treated with carbon, copper sulfide, a metal, or a metal oxide to have conductivity, that is wound around or attached to a cored bar having been treated with a metal etc. to have conductivity.

The charger is not limited to the contact charger. However, the contact charger is preferable because it can reduce the amount of by-product ozone.

Irradiator and Irradiation Process

The irradiator is not limited in configuration so long as it irradiates the charged surface of the electrostatic latent image bearer with light containing image information. Specific examples of the irradiator include, but are not limited to, various irradiators of radiation optical system type, rod lens array type, laser optical type, and liquid crystal shutter optical type.

Specific examples of light sources for use in the irradiator include, but are not limited to, luminescent materials such as fluorescent lamp, tungsten lamp, halogen lamp, mercury lamp, sodium lamp, light emitting diode (LED), laser diode (LD), and electroluminescence (EL).

For the purpose of emitting light having a desired wavelength only, any type of filter can be used such as sharp cut filter, band pass filter, near infrared cut filter, dichroic filter, interference filter, and color-temperature conversion filter.

In the irradiation process, the irradiator irradiates the surface of the electrostatic latent image bearer with light containing image information.

It is also possible that the irradiator irradiates the back surface of the electrostatic latent image bearer with light containing image information.

Developing Device and Developing Process

The developing device is not limited in configuration so long as it develops the electrostatic latent image formed on the electrostatic latent image bearer into a visible image with toner.

The developing process is a process in which the electrostatic latent image formed on the electrostatic latent image bearer is developed into a visible image with toner. The developing process can be performed by the developing device.

The developing device may employ either a dry developing method or a wet developing method. The developing device may be either a single-color developing device or a multi-color developing device.

The developing device preferably includes a stirrer for stirring the toner to frictionally charge the toner and a developer bearer for bearing a developer containing the toner. The developer bearer is rotatable and has an internally-fixed magnetic field generator.

In the developing device, the toner and carrier particles are mixed and stirred and the toner particles are charged by friction. The charged toner particles are retained on the surface of a rotating magnet roller in the form of ears, forming magnetic brush. The magnet roller is disposed adjacent to the electrostatic latent image bearer. Therefore, part of the toner particles composing the magnetic brush formed on the surface of the magnet roller are moved to the surface of the electrostatic latent image bearer by an electric attractive force. As a result, the electrostatic latent image is developed with the toner particles to form a visible image on the surface of the electrostatic latent image bearer.

Other Devices and Other Processes

The other devices may include, for example, a transfer device, a fixing device, a cleaner, a neutralizer, a recycler, and a controller.

The other processes may include, for example, a transfer process, a fixing process, a cleaning process, a neutralization process, a recycle process, and a control process.

Transfer Device and Transfer Process

The transfer device is not limited in configuration long as it transfers the visible image onto a recording medium. The transfer device preferably includes a primary transfer device to transfer the visible image onto an intermediate transfer medium to form a composite image and a secondary transfer device to transfer the composite image onto a recording medium.

The transfer process is a process in which the visible image is transferred onto a recording medium. It is preferable that the visible image is primarily transferred onto an intermediate transfer medium and then secondarily transferred onto the recording medium.

In the transfer process, the visible image is transferred by charging the electrostatic latent image bearer (photoconductor) by a transfer charger. The transfer process can be performed by the transfer device.

In a case in which the image to be secondarily transferred onto the recording medium is a color image composed of multiple color toners, the transfer device sequentially superimpose the multiple color toners one another on the intermediate transfer medium, and then the resulting composite image is transferred from the intermediate transfer medium onto the recording medium at once.

Specific examples of the intermediate transfer medium include, but are not limited to, transfer belt.

The transfer device preferably includes a transferrer to separate the visible image formed on the electrostatic latent image bearer (photoconductor) to the recording medium side by charging. Specific examples of the transferrer include, but are not limited to, corona transferrer, transfer belt, transfer roller, pressure transfer roller, and adhesive transferrer.

The recording medium is not limited in material and may be normal paper, PET films for use in overhead projector (OHP), etc.

Fixing Device and Fixing Process

The fixing device is not limited in configuration so long as it fixes the transferred image on the recoding medium. The fixing device preferably includes a heat-pressure member. Specific examples of the heat-pressure member include, but are not limited to, a combination of a heat roller and a pressure roller; and a combination of a heat roller, a pressure roller, and an endless belt.

The fixing process is a process in which the visible image transferred onto the recording medium is fixed thereon. The fixing process may be performed either every time each color toner is transferred onto the recording medium or at once after all color toners are superimposed on one another.

The fixing process can be performed by the fixing device.

The heating temperature is normally from 80° C. to 200° C.

The fixing device may be used together with or replaced with an optical fixer. In the fixing process, the fixing pressure is preferably from 10 to 80 N/cm².

Cleaner and Cleaning Process

The cleaner is not limited in configuration so long as it removes residual toner particles remaining on the electrostatic latent image bearer. Specific examples of the cleaner include, but are not limited to, magnetic brush cleaner, electrostatic brush cleaner, magnetic roller cleaner, blade cleaner, brush cleaner, and web cleaner.

The cleaning process is a process in which residual toner particles remaining on the electrostatic latent image bearer are removed. The cleaning process can be performed by the cleaner.

Neutralizer and Neutralization Process

The neutralizer is not limited in configuration so long as it neutralizes the electrostatic latent image bearer by applying a neutralization bias thereto. Specific examples of the neutralizer include, but are not limited to, neutralization lamp.

The neutralization process is a process in which the electrostatic latent image bearer is neutralized by being applied with a neutralization bias. The neutralization process can be performed by the neutralizer.

Recycler and Recycle Process

The recycler is not limited in configuration so long as it makes the developing device recycle the toner removed in the cleaning process. Specific examples of the recycler include, but are not limited to, conveyer.

The recycle process is a process in which the toner particles removed in the cleaning process are recycled by the developing device. The recycle process can be performed by the recycler.

Controller and Control Process

The controller is not limited in configuration so long as it controls the above-described processes. Specific examples of the controller include, but are not limited to, sequencer and computer.

The control process is a process in which the above-descried processes are controlled. The control process can be performed by the controller.

Figure 4:
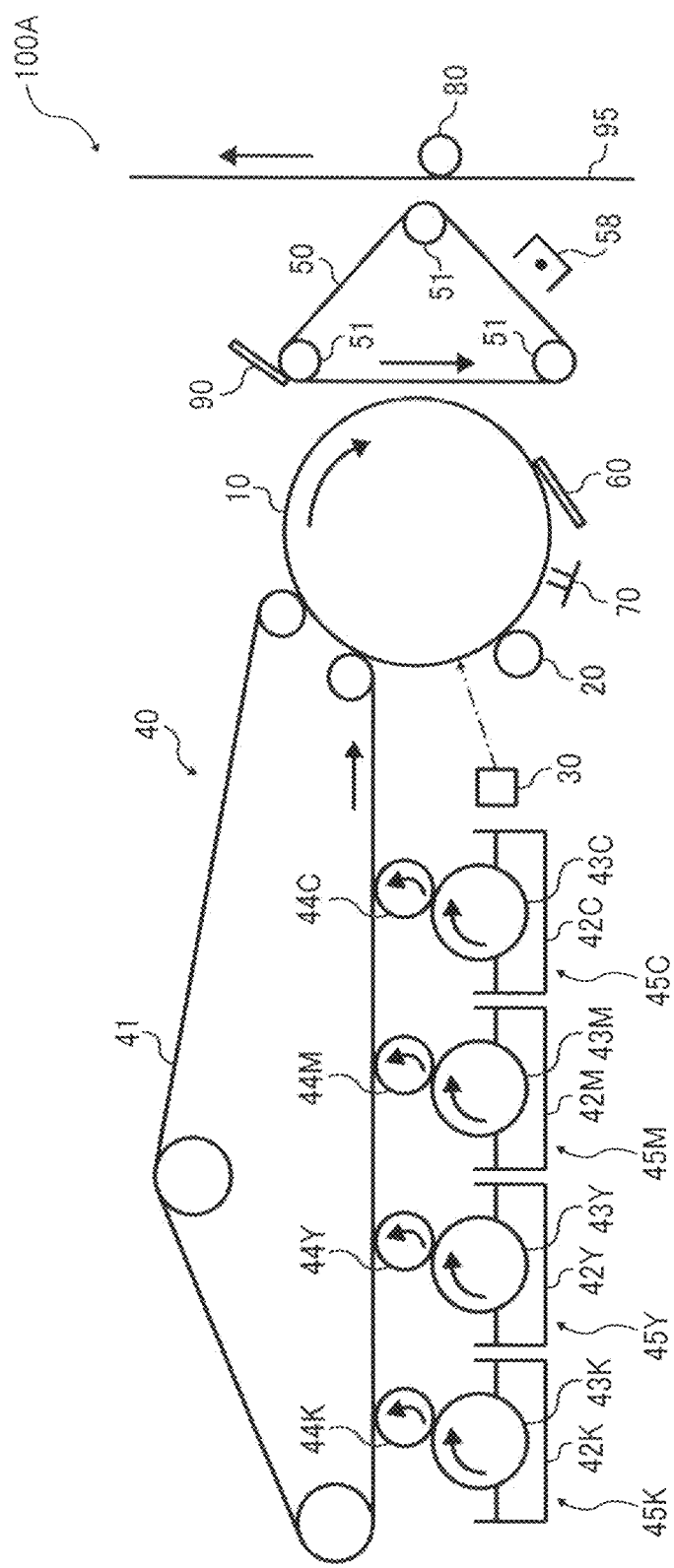
FIG. 4 is a schematic view of an image forming apparatus in accordance with some embodiments of the present invention.

An image forming apparatus according to some embodiments of the present invention is shown in FIG. 4. An image forming apparatus 100A includes an electrostatic latent image bearer 10, a charging roller 20 serving as the charger, an irradiator 30 serving as the irradiator, a developing device 40 serving as the developing device, an intermediate transfer medium 50, a cleaner 60 equipped with a cleaning blade serving as the cleaner, and a neutralization lamp 70 serving as the neutralizer.

The intermediate transfer medium 50 is in the form of an endless belt and is stretched taut by three rollers 51 disposed inside the loop of the endless belt. The intermediate transfer belt 50 is movable in the direction indicated by arrow in FIG. 4. A part of the three rollers 51 also function(s) as transfer bias roller(s) capable of applying a predetermined transfer bias (primary transfer bias) to the intermediate transfer medium 50. A cleaner 90 equipped with a cleaning blade is disposed adjacent to the intermediate transfer medium 50. A transfer roller 80, serving as the transfer device, capable of applying a transfer bias (secondary transfer bias) to a transfer paper 95, serving as a recording medium, for transferring the toner image on the transfer paper 95 is disposed facing the intermediate transfer medium 50. Around the intermediate transfer medium 50, a corona charger 58 to give charge to the toner image on the intermediate transfer medium 50 is disposed between the contact point of the intermediate transfer medium 50 with the electrostatic latent image bearer 10 and the contact point of the intermediate transfer medium 50 with the transfer paper 95 relative to the direction of rotation of the intermediate transfer medium 50.

The developing device 40 includes a developing belt 41 serving as the developer bearer; and a black developing unit 45K, a yellow developing unit 45Y, a magenta developing unit 45M, and a cyan developing unit 45C each disposed around the developing belt 41. The black developing unit 45K contains a developer container 42K, developer supplying roller 43K, and a developing roller 44K. The yellow developing unit 45Y contains a developer container 42Y, developer supplying roller 43Y, and a developing roller 44Y. The magenta developing unit 45M contains a developer container 42M, developer supplying roller 43M, and a developing roller 44M. The cyan developing unit 45C contains a developer container 42C, developer supplying roller 43C, and a developing roller 44C. The developing belt 41 is in the form of an endless belt and rotatably stretched taut by multiple belt rollers. The developing belt 41 is in contact with the electrostatic latent image bearer 10 in part.

In the image forming apparatus 100A illustrated in FIG. 4, first, the charging roller 20 uniformly charges the electrostatic latent image bearer 10. The irradiator 30 irradiates the electrostatic latent image bearer 10 with light containing image information to form an electrostatic latent image thereon. The electrostatic latent image formed on the electrostatic latent image bearer 10 is developed into a toner image with toner supplied from the developing device 40. The toner image is primarily transferred onto the intermediate transfer medium 50 by a voltage applied from the roller 51 and then secondarily transferred onto the transfer paper 95. Residual toner particles remaining on the electrostatic latent image bearer 10 are removed by the cleaner 60, and then residual charge remaining on the electrostatic latent image bearer 10 is removed by the neutralization lamp 70.

Figure 5:
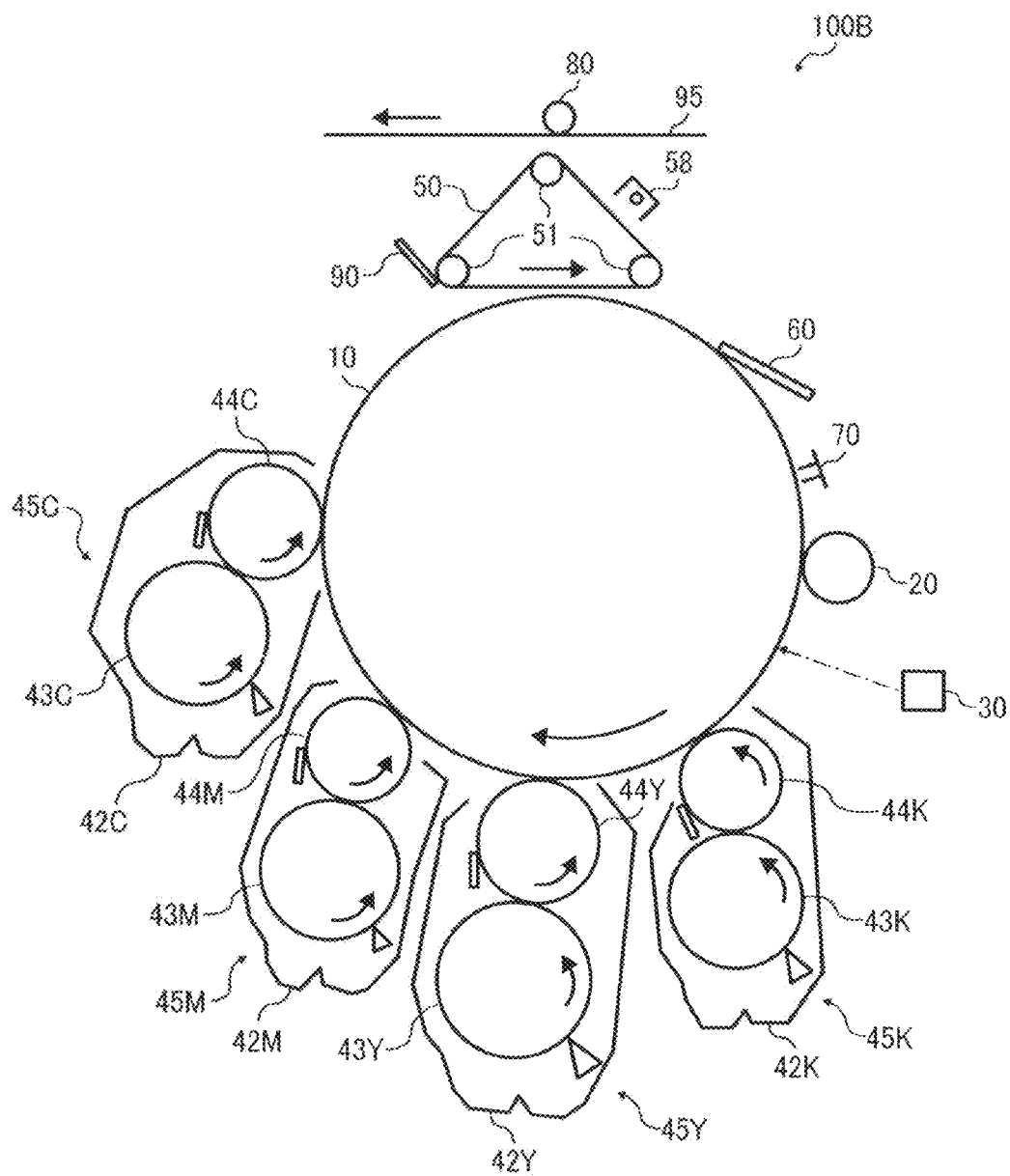
FIG. 5 is a schematic view of another image forming apparatus in accordance with some embodiments of the present invention.

FIG. 5 is a schematic view of another image forming apparatus according to some embodiments of the present invention. An image forming apparatus 100B has the same configuration as the image forming apparatus 100A except that the developing belt 41 is eliminated and the black developing unit 45K, yellow developing unit 45Y, magenta developing unit 45M, and cyan developing unit 45C are each disposed directly facing the electrostatic latent image bearer 10.

Figure 6:
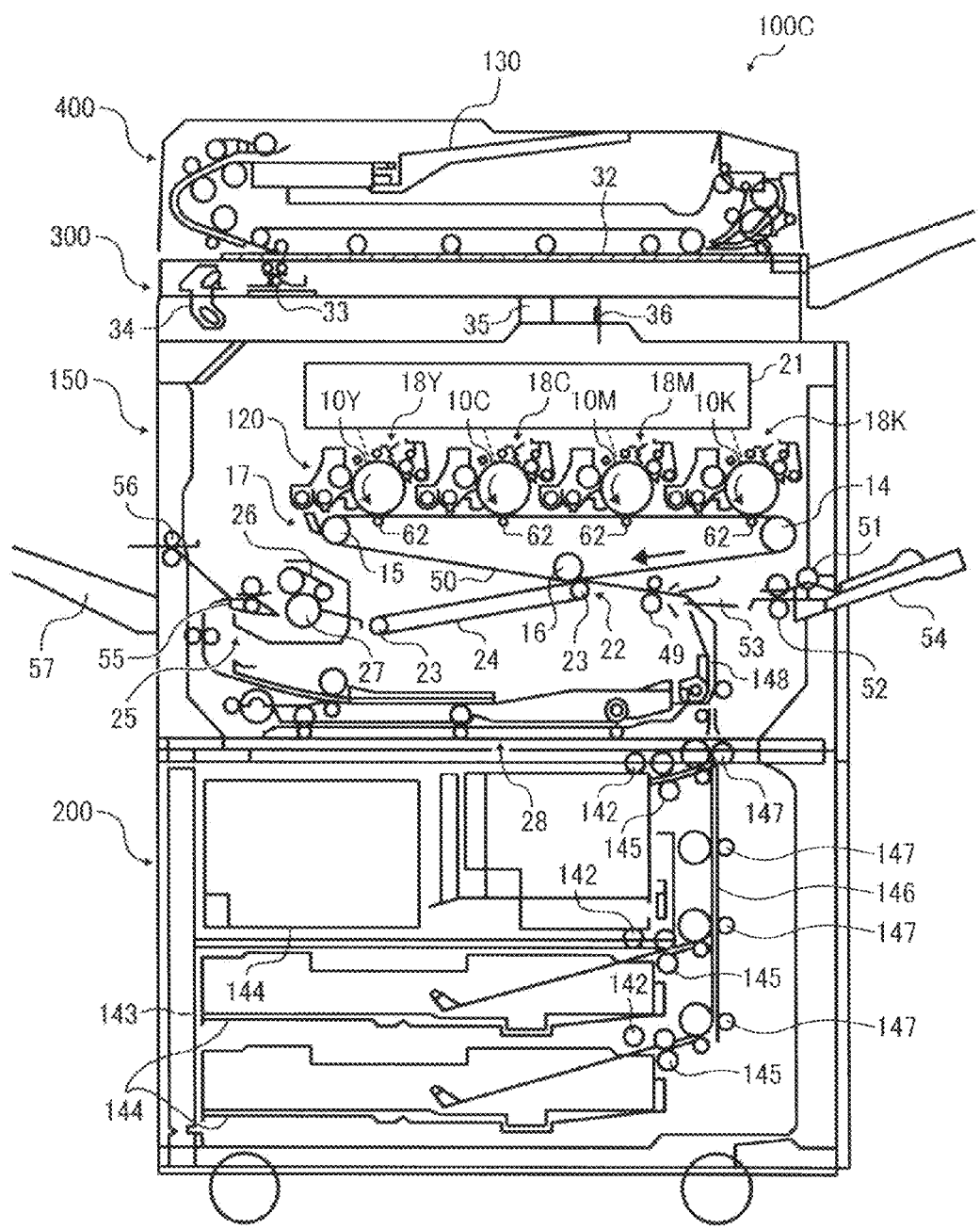
FIG. 6 is a schematic view of yet another image forming apparatus in accordance with some embodiments of the present invention.

An image forming apparatus 100C illustrated in FIG. 6 includes a main body 150, a paper feeding table 200, a scanner 300, and an automatic document feeder (ADF) 400.

An intermediate transfer medium 50 in the form of an endless belt is disposed at the center of the main body 150. The intermediate transfer medium 50 is stretched taut with three support rollers 14, 15, and 16 and is rotatable clockwise in FIG. 6. A cleaner 17 for removing residual toner particles remaining on the intermediate transfer medium 50 is disposed adjacent to the support roller 15. Image forming units 18Y, 18C, 18M, and 18K to produce respective images of yellow, cyan, magenta, and black are arranged in tandem along a surface of the intermediate transfer medium 50 stretched between the support rollers 14 and 15, constituting a tandem image forming part 120. An irradiator 21 is disposed adjacent to the tandem image forming part 120. A secondary transfer device 22 is disposed on the opposite side of the tandem image forming part 120 relative to the intermediate transfer medium 50. In the secondary transfer device 22, a secondary transfer belt 24 in the form of an endless belt is stretched taut with a pair of rollers 23. A sheet of transfer paper conveyed on the secondary transfer belt 24 is contactable with the intermediate transfer medium 50. A fixing device 25 is disposed adjacent to the secondary transfer device 22. The fixing device 25 includes a fixing belt 26 in the form of an endless belt and a pressing roller 27 pressed against the fixing belt 26.

A sheet reversing device 28 is disposed adjacent to the secondary transfer device 22 and the fixing device 25. The sheet reversing device 28 reverses a sheet of transfer paper upside down so that images can be formed on both sides of the sheet.

In the tandem image forming part 120, a full-color image is produced in the manner described below. A document is set on a document table 130 of the automatic document feeder 400 or on a contact glass 32 of the scanner 300 while the automatic document feeder 400 is lifted up, followed by holding down of the automatic document feeder 400.

As a switch is pressed, in a case in which a document is set on the contact glass 32, the scanner 300 immediately starts driving. In a case in which a document is set on the automatic document feeder 400, the scanner 300 starts driving after the document is fed onto the contact glass 32. A first runner 33 and a second runner 34 then start running. The first runner 33 directs light from a light source to the document, and reflects light reflected from the document toward the second runner 34. A mirror in the second runner 34 reflects the light toward a reading sensor 36 through an imaging lens 35. Thus, the document is read and converted into image information of yellow, cyan, magenta, and black.

Figure 7:
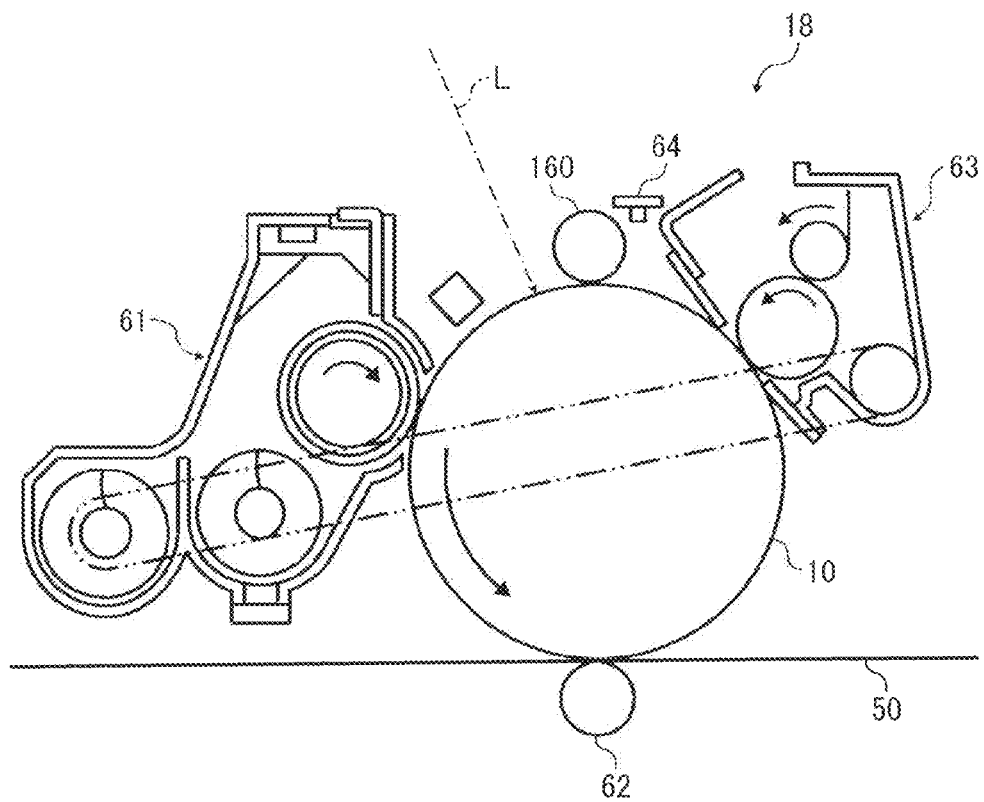
FIG. 7 is a partial magnified view of FIG. 6.

The image information of yellow, cyan, magenta, and black are respectively transmitted to the image forming units 18Y, 18C, 18M, and 18K. The image forming units 18Y, 18C, 18M, and 18K form respective toner images of yellow, cyan, magenta, and black. As illustrated in FIG. 7, each of the image forming units 18 includes an electrostatic latent image bearer 10, a charger 160 to uniformly charge the electrostatic latent image bearer 10, an irradiator to irradiate the charged surface of the electrostatic latent image bearer 10 with light L containing image information to form an electrostatic latent image thereon, a developing device 61 to develop the electrostatic latent image into a toner image with each color toner, a transfer charger 62 to transfer the toner image onto the intermediate transfer medium 50, a cleaner 63, and a neutralizer 64. The image forming units 18Y, 18C, 18M, and 18K respectively form single-color toner images of yellow, cyan, magenta, and black. The toner images of yellow, cyan, magenta, and black are primarily transferred sequentially from the respective electrostatic latent image bearers 10Y, 10C, 10M, and 10K onto the intermediate transfer medium 50 that is rotatably moved by the support rollers 14, 15, and 16. Thus, the toner images of yellow, cyan, magenta, and black are superimposed on one another on the intermediate transfer medium 50, forming a composite full-color toner image.

On the other hand, as the switch is pressed, one of paper feed rollers 142 starts rotating in the paper feeding table 200 to feed sheets of a recording medium from one of paper feed cassettes 144 in a paper bank 143. One of separation rollers 145 separates the sheets one by one and feeds them to a paper feed path 146. Feed rollers 147 feed each sheet to a paper feed path 148 in the main body 150. The sheet is stopped upon striking a registration roller 49. Alternatively, a feed roller 51 starts rotating to feed sheets of a recording medium from a manual feed tray 54. A separation roller 52 separates the sheets one by one and feeds them to a manual paper feed path 53. The sheet is stopped upon striking the registration roller 49. The registration roller 49 is generally grounded. Alternatively, it is possible that the registration roller 49 is applied with a bias for the purpose of removing paper powders from the recording medium. The registration roller 49 starts rotating to feed the sheet to between the intermediate transfer medium 50 and the secondary transfer device 22 in synchronization with an entry of the composite full-color toner image formed on the intermediate transfer medium 50 thereto so that the composite full-color toner image can be secondarily transferred onto the sheet of a recording medium. Thus, the composite full-color toner image is formed on the sheet of a recording medium. Residual toner particles remaining on the intermediate transfer medium 50 are removed by the cleaner 17.

The sheet having the composite full-color toner image thereon is fed from the secondary transfer device 22 to the fixing device 25. The fixing device 25 fixes the composite full-color toner image on the sheet by application of heat and pressure. The switch claw 55 switches paper feed paths so that the sheet is ejected by an ejection roller 56 onto an ejection tray 57. Alternatively, the switch claw 55 may switch paper feed paths so that the sheet is introduced into the sheet reversing device 28. In the sheet reversing device 28, the sheet gets reversed to record another image on the back side of the sheet. Thereafter, the sheet is ejected by the ejection roller 56 onto the ejection tray 57.

Process Cartridge

In accordance with some embodiments of the present invention, a process cartridge is provided. The process cartridge includes at least an electrostatic latent image bearer and a developing device to develop an electrostatic latent image formed on the electrostatic latent image bearer into a visible image with the toner according to some embodiments of the present invention, and optionally other devices, if necessary.

The process cartridge is detachably mountable on the image forming apparatus.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Measurement of Deformation Rate of Toner

A toner in an amount of 0.2 g is formed into a pellet with a pelletizer having a width of 8 mm. The thickness of the pellet is 2±0.3 mm.

The pellet is set in a thermo mechanical analyzer TMA SS7100 from Seiko Instruments Inc. The pellet is subjected to humidity conditioning for 15 minutes, and then a measurement with a load of from −10 to −1,000 mN at a loading speed of 20 mN/min. The measurement is performed by a rheometer HAAKE C25P from Thermo Fisher Scientific K.K. setting the environmental temperature and relative humidity to 40° C. and 80%, respectively. Deformation rate is determined from the following formula.

Deformation Rate=(Deformation Amount (mm) at −100 gf (980 mN))/(Thickness of Pellet (mm))× 100

Production Example 1

Production of Amorphous Polyester Resin B1

A 5-liter four-neck flask equipped with a nitrogen inlet pipe, a dewatering pipe, a stirrer, and a thermocouple is charged with propylene glycol serving as a diol, and dimethyl terephthalate and dimethyl adipate each serving as a dicarboxylic acid, with the molar ratio of dimethyl terephthalate to dimethyl adipate being 85/15 and the ratio of OH groups to COOH groups being 2.0. The flask contents are allowed to react in the presence of 300 ppm of titanium tetraisopropoxide based on the total weight of the monomers while the produced methanol is allowed to flow out. The reaction system is eventually heated to 230° C. and the reaction is continued until the resin acid value becomes 5 or less. The reaction is further continued under reduced pressures of from 20 to 30 mmHg until Mw becomes 10,000. Thus, a linear polyester resin, i.e., an amorphous polyester resin B1, is prepared.

The resin has an acid value (AV) of 0.3 mgKOH/g, a hydroxyl value (OHV) of 28.4 mgKOH/g, and a glass transition temperature (Tg) of 50.5° C.

Production Example 2

Production of Amorphous Polyester Resin B2

A 5-liter four-neck flask equipped with a nitrogen inlet pipe, a dewatering pipe, a stirrer, and a thermocouple is charged with propylene glycol serving as a diol, and dimethyl terephthalate and dimethyl succinate each serving as a dicarboxylic acid, with the molar ratio of dimethyl terephthalate to dimethyl succinate being 85/15 and the ratio of OH groups to COOH groups being 2.0. The flask contents are allowed to react in the presence of 300 ppm of titanium tetraisopropoxide based on the total weight of the monomers while the produced methanol is allowed to flow out. The reaction system is eventually heated to 230° C. and the reaction is continued until the resin acid value becomes 5 or less. The reaction is further continued under reduced pressures of from 20 to 30 mmHg until Mw becomes 10,000. Thus, a linear polyester resin, i.e., an amorphous polyester resin B2, is prepared.

The resin has an acid value (AV) of 0.26 mgKOH/g, a hydroxyl value (OHV) of 24.1 mgKOH/g, and a glass transition temperature (Tg) of 64.4° C.

Production Example 3

Production of Amorphous Polyester Resin B3

A 5-liter four-neck flask equipped with a nitrogen inlet pipe, a dewatering pipe, a stirrer, and a thermocouple is charged with propylene glycol serving as a diol, and dimethyl terephthalate and dimethyl adipate each serving as a dicarboxylic acid, with the molar ratio of dimethyl terephthalate to dimethyl adipate being 82/18 and the ratio of OH groups to COOH groups being 1.2. The flask contents are allowed to react in the presence of 300 ppm of titanium tetraisopropoxide based on the total weight of the monomers while the produced methanol is allowed to flow out. The reaction system is eventually heated to 230° C. and the reaction is continued until the resin acid value becomes 5 or less. The reaction is further continued for 4 hours under reduced pressures of from 20 to 30 mmHg. Thus, a linear polyester resin, i.e., an amorphous polyester resin B3, is prepared.

The resin has an acid value (AV) of 0.40 mgKOH/g, a hydroxyl value (OHV) of 27.0 mgKOH/g, and a glass transition temperature (Tg) of 41.2° C.

Production Example 4

Production of Amorphous Polyester Resin B4

A 5-liter four-neck flask equipped with a nitrogen inlet pipe, a dewatering pipe, a stirrer, and a thermocouple is charged with propylene glycol serving as a diol and dimethyl terephthalate serving as a dicarboxylic acid, with the ratio of OH groups to COOH groups being 1.2. The flask contents are allowed to react in the presence of 300 ppm of titanium tetraisopropoxide based on the total weight of the monomers while the produced methanol is allowed to flow out. The reaction system is eventually heated to 230° C. and the reaction is continued until the resin acid value becomes 5 or less. The reaction is further continued for 4 hours under reduced pressures of from 20 to 30 mmHg. Thus, a linear polyester resin, i.e., an amorphous polyester resin B4, is prepared.

The resin has an acid value (AV) of 0.37 mgKOH/g, a hydroxyl value (OHV) of 25.3 mgKOH/g, and a glass transition temperature (Tg) of 72.0° C.

Production Example 5

Production of Crystalline Resin A1

A 5-liter four-neck flask equipped with a nitrogen inlet pipe, a dewatering pipe, a stirrer, and a thermocouple is charged with 1,4-butanediol and sebacic acid, with the ratio of OH groups to COOH groups being 1.1. The flask contents are allowed to react in the presence of 300 ppm of titanium tetraisopropoxide based on the total weight of the monomers while the produced water is allowed to flow out. The reaction system is eventually heated to 230° C. and the reaction is continued until the resin acid value becomes 5 mgKOH/g or less. The reaction is further continued for 6 hours under reduced pressures of 10 mmHg or less. Thus, a crystalline polyester resin, i.e., a crystalline resin A1, is prepared.

The resin has an acid value (AV) of 0.38 mgKOH/g, a hydroxyl value (OHV) of 22.6 mgKOH/g, and a softening temperature (Tm) of 63.8° C.

Production Example 6

Production of Crystalline Resin A2

A 5-liter four-neck flask equipped with a nitrogen inlet pipe, a dewatering pipe, a stirrer, and a thermocouple is charged with 1,4-butanediol and dodecanedioic acid, with the ratio of OH groups to COOH groups being 1.1. The flask contents are allowed to react in the presence of 300 ppm of titanium tetraisopropoxide based on the total weight of the monomers while the produced water is allowed to flow out. The reaction system is eventually heated to 230° C. and the reaction is continued until the resin acid value becomes 5 mgKOH/g or less. The reaction is further continued for 4 hours under reduced pressures of 10 mmHg or less. Thus, a crystalline polyester resin, i.e., a crystalline resin A2, is prepared.

The resin has an acid value (AV) of 6.1 mgKOH/g, a hydroxyl value (OHV) of 25.9 mgKOH/g, and a softening temperature (Tm) of 72.1° C.

Production Example 7

Production of Block Copolymer C1 to C3 and C5

A 5-liter four-neck flask equipped with a nitrogen inlet pipe, a dewatering pipe, a stirrer, and a thermocouple is charged with 1,400 g of the amorphous polyester resin B1 and 600 g of the crystalline resin A1, and is subjected to reduced-pressure drying at 60° C. and 10 mmHg for 2 hours. After releasing nitrogen pressure, 2,000 g of ethyl acetate having been dewatered with molecular sieves 4A are added to the flask. The resins are uniformly dissolved in the ethyl acetate under nitrogen gas flow. After adding 140 g of 4,4'-diphenylmethane diisocyanate, the reaction system is stirred until it becomes visually uniform. Further, 100 ppm of tin 2-ethylhexanoate are added as a catalyst. The reaction system is heated to 80° C. and subjected to a reaction for 5 hours under reflux. Thereafter, the ethyl acetate is removed under reduced pressures. Thus, a block copolymer C1 is obtained.

The above procedure is repeated except for replacing the amorphous polyester resin B1 with the amorphous polyester B2, thus obtaining a block copolymer C2. The above procedure is repeated except for replacing the amorphous polyester resin B1 with the amorphous polyester B3, thus obtaining a block copolymer C3.

The above procedure is repeated except for replacing the crystalline resin A1 with the crystalline resin A2, thus obtaining a block copolymer C5.

Production Example 8

Production of Block Copolymer C4

A 5-liter four-neck flask equipped with a nitrogen inlet pipe, a dewatering pipe, a stirrer, and a thermocouple is charged with 1,600 g of the amorphous polyester resin B4 and 400 g of the crystalline resin A1, and is subjected to reduced-pressure drying at 60° C. and 10 mmHg for 2 hours. After releasing nitrogen pressure, 2,000 g of ethyl acetate having been dewatered with molecular sieves 4A are added to the flask. The resins are uniformly dissolved in the ethyl acetate under nitrogen gas flow. After adding 140 g of 4,4'-diphenylmethane diisocyanate, the reaction system is stirred until it becomes visually uniform. Further, 100 ppm of tin 2-ethylhexanoate are added as a catalyst. The reaction system is heated to 80° C. and subjected to a reaction for 5 hours under reflux. Thereafter, the ethyl acetate is removed under reduced pressures. Thus, a block copolymer C4 is obtained.

Production Example 9

Production of Block Copolymer C6

A 5-liter four-neck flask equipped with a nitrogen inlet pipe, a dewatering pipe, a stirrer, and a thermocouple is charged with 1,600 g of the amorphous polyester resin B1 and 400 g of the crystalline resin A1, and is subjected to reduced-pressure drying at 60° C. and 10 mmHg for 2 hours. After releasing nitrogen pressure, 2,000 g of ethyl acetate having been dewatered with molecular sieves 4A are added to the flask. The resins are uniformly dissolved in the ethyl acetate under nitrogen gas flow. After adding 140 g of 4,4'-diphenylmethane diisocyanate, the reaction system is stirred until it becomes visually uniform. Further, 100 ppm of tin 2-ethylhexanoate are added as a catalyst. The reaction system is heated to 80° C. and subjected to a reaction for 5 hours under reflux. Thereafter, the ethyl acetate is removed under reduced pressures. Thus, a block copolymer C6 is obtained.

Production Example 10

Production of Colorant Master Batch P1 to P6

First, 100 parts of the block copolymer C1, 100 parts of a cyan pigment (C.I. Pigment Blue 15:3), and 30 parts of ion-exchange water are mixed well. The mixture is then kneaded with an open-roll kneader (KNEADEX from and Mitsui Mining Company, Ltd.). The kneading is started with a kneading temperature of 90° C., and the kneading temperature is gradually decreased to 50° C. Thus, a colorant master batch P1 having a resin/pigment ratio of 1/1 is prepared.

The above procedure is repeated except for replacing the block copolymer C1 with each of the block copolymers C2 to C6. Thus, colorant master batches P2 to P6 are prepared.

Production Example 11

Production of Wax Dispersion Liquid

A reaction vessel equipped with a condenser tube, a thermometer, and a stirrer is charged with 20 parts of a paraffin wax (HNP-9 from Nippon Seiro Co., Ltd., having a melting point of 75° C.) and 80 parts of ethyl acetate. The vessel contents are heated to 78° C. so that the wax is well dissolved in the ethyl acetate, and then cooled to 30° C. over a period of 1 hour while being stirred. The resulting liquid is subjected to a wet pulverization treatment using an ULTRAVISCOMILL (from Aimex Co., Ltd.) filled with 80% by volume of zirconia beads having a diameter of 0.5 mm, at a liquid feeding speed of 1.0 kg/hour and a disc peripheral speed of 10 msec. This dispersing operation is repeated 6 times (6 passes). An amount of ethyl acetate is added to adjust the solid content concentration. Thus, a wax dispersion liquid having a solid content concentration of 20% is prepared.

Example 1

Production of Toner 1

A vessel equipped with a thermometer and a stirrer is charged with 94 parts of the block copolymer C1 and 81 parts of ethyl acetate. The vessel contents are heated to above the melting point of the copolymer so that the copolymer is well dissolved in the ethyl acetate. Further, 25 parts of the wax dispersion liquid and 12 parts of the colorant master batch P1 are added to the vessel. The vessel contents are stirred by a TK HOMOMIXER (from PRIMIX Corporation) at a revolution of 10,000 rpm at 50° C. so that they are uniformly dissolved or dispersed. Thus, an oily phase 1 is prepared. The temperature of the oily phase 1 is kept to 50° C. in a container.

Another reaction vessel equipped with a stirrer and a thermometer is charged with 75 parts of ion-exchange water, 3 parts of a 25% dispersion liquid of fine particles of an organic resin (i.e., a copolymer of styrene, methacrylate, butyl acrylate, and sodium salt of sulfate of ethylene oxide adduct of methacrylic acid) (available from Sanyo Chemical Industries, Ltd.), 1 part of carboxymethylcellulose sodium, 16 parts of a 48.5% aqueous solution of dodecyl diphenyl ether sodium disulfonate (ELEMINOL MON-7 from Sanyo Chemical Industries, Ltd.), and 5 parts of ethyl acetate. These materials are mixed and stirred at 40° C., thus preparing an aqueous phase liquid.

The aqueous phase liquid is mixed with 50 parts of the oily phase 1 having been kept at 50° C. with a TK HOMO-MIXER (from PRIMIX Corporation) at a revolution of 12,000 rpm for 1 minute at from 45° C. to 48° C. Thus, an emulsion slurry 1 is prepared.

The emulsion slurry 1 is contained in a vessel equipped with a stirrer and a thermometer, and subjected to solvent removal for 2 hours at 50° C. Thus, a slurry 1 of of mother toner particles is prepared.

The slurry 1 in an amount of 100 parts is subjected to filtration under reduced pressures and then the following washing processes (1) to (4), thus obtaining a filter cake 1.
(1) The filter cake is mixed with 100 parts of ion-exchange water using a TK HOMOMIXER at a revolution of 6,000 rpm for 5 minutes and then filtered.
(2) The filter cake of (1) is mixed with 100 parts of a 10% aqueous solution of sodium hydroxide using a TK HOMO-MIXER at a revolution of 6,000 rpm for 10 minutes and then filtered under reduced pressures.
(3) The filter cake of (2) is mixed with 100 parts of 10% hydrochloric acid using a TK HOMOMIXER at a revolution of 6,000 rpm for 5 minutes and then filtered.
(4) The filter cake of (3) is mixed with 300 parts of ion-exchange water using a TK HOMOMIXER at a revolution of 6,000 rpm for 5 minutes and then filtered. This operation is repeated twice.

The filter cake 1 is dried by a circulating air drier at 45° C. for 48 hours and then filtered with a mesh having an opening of 75 μm. Thus, a mother toner particle 1 is prepared.

The mother toner particle 1 in an amount of 100 parts is mixed with 1.0 part of a hydrophobized silica (HDK-2000 from Wacker Chemie AG) and 0.3 parts of a titanium oxide (MT-150AI from Tayca Corporation) by a HENSCHEL MIXER. Thus, a toner 1 is prepared.

Production of Carrier 1

As a core material, 5,000 parts of a Mn ferrite particle (having a weight average particle diameter of 35 μm) are used.

A coating liquid is prepared by dispersing the following materials by a stirrer for 10 minutes: 300 parts of toluene, 300 parts of butyl cellosolve, 60 parts of a toluene solution of an acrylic resins (having a composition: methacrylic acid/methyl methacrylate/2-hydroxyethylacrylate=5/9/3, a solid content concentration of 50%, and a Tg of 38° C.), 15 parts of a toluene solution of a N-tetramethoxymethylbenzoguanamine resin (having a polymerization degree of 1.5 and a solid content concentration of 77%), and 15 parts of an alumina particle (having an average primary particle diameter of 0.30 μm).

The coating liquid is applied to the core material by a coater having a fluidized bed equipped with a rotary bottom-plate disc and stirring blades, which forms a swirl flow. The coated core material is burned in an electric furnace at 220° C. for 2 hours. Thus, a carrier 1 is prepared.

Production of Developer 1

The carrier 1 in an amount of 100 parts and the toner 1 in an amount of 7 parts are uniformly mixed with a TURBLA® mixer (from Willy A. Bachofen AG), which performs mixing by rolling of a container, at a revolution of 48 rpm for 5 minutes. Thus, a developer 1, being a two-component developer, is prepared.

Evaluations

The toner 1 and developer 1 are subjected to quality evaluation as follows. The developer 1 is set in the developing unit in the tandem-type image forming apparatus 100C illustrated in FIG. 6. The results are shown in Tables 1 and 2.

Scratches will be made on the image at the time of recrystallization immediately after the heat-fixing. In the image forming apparatus 100C, such scratches will be made when the recording medium passes though the ejection roller 56 or the conveyance rollers disposed in the reversing device 28.

Evaluation of Thermal Properties (DSC Measurement)

A measurement sample in an amount of 5 mg is charged in a simple sealed pan Tzero (from TA Instruments) and subjected to a measurement with a differential scanning calorimeter (Q2000 from TA Instruments).

In the measurement, under nitrogen gas flow, the sample is heated from 10° C. to 150° C. at a heating rate of 10° C./min (i.e., the first heating) and kept for 5 minutes, and then cooled to −50° C. at a cooling rate of 10° C./min and kept for 5 minutes.

Next, the sample is heated at a heating rate of 10° C./min (i.e., the second heating) to measure thermal change. A graph showing the relation between the quantity of heat absorption or generation and temperature is drawn. Glass transition temperature (Tg), cold crystallization temperature, melting point, crystallization temperature, etc., are determined in accordance with known methods. Tg is determined from the DSC curve in the first heating by the midpoint method. When two or more endothermic peaks are observed, the total amount of heat with respect to all the peaks is regarded as the endothermic quantity. The heat quantity obtained from the DSC curve in the first heating is identified as Q1. The heat quantity obtained from the DSC curve in the second heating is identified as Q2.

Evaluation of Particle Size Distribution (Measurement of Dv and Dv/Dn)

The volume average particle diameter (Dv), and the ratio of the volume average particle diameter (Dv) to the number average particle diameter (Dn), of each toner are measured in the aforementioned manner. As the measuring instrument, a COULTER COUNTER TA-II (from Beckman Coulter, Inc.) is used.

Evaluation of Low-Temperature Fixability (Lower-Limit Fixable Temperature)

A solid image with a toner deposition amount of 0.85±0.10 mg/cm$^2$ and an image area of 3 cm×8 cm is formed on sheets of a transfer paper (printing paper <70> from Ricoh Japan Co., Ltd.) and fixed on each sheet at various fixing belt temperatures. The fixed image is subjected to a scratch drawing test with a drawing tester AD-401 (from Ueshima Seisakusho Co., Ltd.) equipped with a ruby needle (having a point radius of from 260 to 320 μm and a point angle of 60 degrees) at a load of 50 g. The image surface is then strongly rubbed with a fabric (HONECOTTO #440 from SAKATA INX ENG. CO., LTD) for 5 times. The temperature of the fixing belt at which almost no peeling-off of the image occurs is determined as the lower-limit fixable temperature. The solid image is formed on a sheet at a position 3.0 cm apart from the leading edge of the sheet in the paper feeding direction. The sheet is passed through the nip portion of the fixing device at a speed of 280 mm/s.

As the lower-limit fixable temperature gets lower, the low-temperature fixability gets better. Low-temperature fixability is evaluated in terms of lower-limit fixable temperature based on the following criteria.

Evaluation Criteria

AA: Not greater than 105° C.

A: Greater than 105° C. and not greater than 115° C.

B: Greater than 115° C. and not greater than 130° C.

C: Greater than 130° C.

Evaluation of Fixability (Hot Offset Resistance and Fixable Temperature Range)

A solid image with a toner deposition amount of 0.85±0.10 mg/cm$^2$ and an image area of 3 cm×8 cm is formed on sheets of a transfer paper (TYPE 6200 from Ricoh Co., Ltd.) and fixed on each sheet at various fixing belt temperatures. The fixed images are visually observed to determine whether hot offset has occurred or not. The difference between the upper-limit temperature above which hot offset occur and the lower-limit fixable temperature is defined as the fixable temperature range. The solid image is formed on a sheet at a position 3.0 cm apart from the leading edge of the sheet in the paper feeding direction. The sheet is passed through the nip portion of the fixing device at a speed of 280 mm/s.

The wider the fixable temperature range, the better the hot offset resistance. A normal fixable temperature range for conventional full-color toners is approximately 50° C. Fixability is evaluated in terms of the fixable temperature range base on the following criteria.

Evaluation Criteria

AA: Greater than 100° C.

A: Greater than 55° C. and not greater than 100° C.

B: Greater than 30° C. and not greater than 55° C.

C: Not greater than 30° C.

Evaluation of Heat-Resistant Storage Stability (Penetration)

A 50-mL glass vial is filled with each toner and left in a constant-temperature chamber at 50° C. for 24 hours, followed by cooling to 24° C. The toner is then subjected to a penetration test based on JIS K-2235-1991 to measure a penetration (mm). The greater the penetration, the better the heat-resistant storage stability of the toner. When the penetration is less than 5 mm, there is a high possibility that the toner causes a problem in practical use. The penetration here refers to the depth (mm) of penetration.

Evaluation Criteria

AAA: The penetration is not less than 28 mm.

AA: The penetration is not less than 25 mm and less than 28 mm.

A: The penetration is not less than 15 mm and less than 25 mm.

B: The penetration is not less than 5 mm and less than 15 mm.

C: The penetration is less than 5 mm.

Evaluation of Storage Stability Under High-Temperature and High-Humidity Conditions Each toner in an amount of 2.5 g is contained in a glass vessel and left in a constant-temperature chamber at a temperature of 40° C. and a humidity of 70% for 3 days with its cap open, followed by cooling to 24° C. After the cap is fastened, the glass vessel is subjected to tapping for 150 times and left in a constant-temperature chamber at a temperature of 50° C. for 24 hours. After being cooled to 24° C., the toner is subjected to a penetration test based on JIS K-2235-1991 to measure a penetration (mm). The greater the penetration, the better the heat-resistant storage stability of the toner. When the penetration is less than 5 mm, there is a high possibility that the toner causes a problem in practical use. The penetration here refers to the depth (mm) of penetration.

Evaluation Criteria

AA: The penetration is not less than 5 mm.

A: The penetration is not less than 3 mm and less than 5 mm.

C: The penetration is less than 3 mm.

Example 2

Production of Toner 2 and Developer 2

The procedure in Example 1 is repeated except for replacing the block copolymer C1 and the colorant master batch P1 with the block copolymer C2 and the colorant master batch P2, respectively. Thus, a toner 2 and a developer 2 are prepared and subjected to the above-described quality evaluation.

The results are shown in Tables 1 and 2.

Example 3

Production of Toner 3 and Developer 3

The procedure in Example 1 is repeated except for replacing the block copolymer C1 and the colorant master batch P1 with the block copolymer C5 and the colorant master batch P5, respectively. Thus, a toner 3 and a developer 3 are prepared and subjected to the above-described quality evaluation.

The results are shown in Tables 1 and 2.

Example 4

Production of Toner 4 and Developer 4

The procedure in Example 1 is repeated except for replacing the block copolymer C1 and the colorant master batch P1 with the block copolymer C6 and the colorant master batch P6, respectively. Thus, a toner 4 and a developer 4 are prepared and subjected to the above-described quality evaluation.

The results are shown in Tables 1 and 2.

Comparative Example 1

Production of Toner 7 and Developer 7

The procedure in Example 1 is repeated except for replacing the block copolymer C1 and the colorant master batch P1 with the block copolymer C3 and the colorant master batch P3, respectively. Thus, a toner 7 and a developer 7 are prepared and subjected to the above-described quality evaluation.

The results are shown in Tables 1 and 2.

Comparative Example 2

Production of Toner 8 and Developer 8

The procedure in Example 1 is repeated except for replacing the block copolymer C1 and the colorant master batch P1 with the block copolymer C4 and the colorant master batch P4, respectively. Thus, a toner 8 and a developer 8 are prepared and subjected to the above-described quality evaluation.

The results are shown in Tables 1 and 2.

Example 5

Synthesis of Prepolymer 1

A reaction vessel equipped with a condenser tube, a stirrer, and a nitrogen inlet pipe is charged with 712 parts of ethylene oxide 2 mol adduct of bisphenol A, 81 parts of propylene oxide 2 mol adduct of bisphenol A, 285 parts of terephthalic acid, 22 parts of trimellitic anhydride, and 2 parts of dibutyltin oxide. The vessel contents are subjected to a reaction for 8 hours at 230° C. under normal pressure and subsequent 5 hours under reduced pressures of from 10 to 15 mmHg. Thus, an intermediate polyester 1 is prepared. The intermediate polyester has a Tg of 57° C.

Another reaction vessel equipped with a condenser tube, a stirrer, and a nitrogen inlet pipe is charged with 410 parts of the intermediate polyester 1, 89 parts of isophorone diisocyanate, and 500 parts of ethyl acetate. The vessel contents are subjected to a reaction for 5 hours at 100° C. Thus, a prepolymer 1 is prepared.

Production of Toner 5 and Developer 5

A vessel equipped with a thermometer and a stirrer is charged with 79 parts of the block copolymer C1, 5 parts of the crystalline resin A1, and 61 parts of ethyl acetate. The vessel contents are heated to above the melting point of the resins so that the resins are well dissolved in the ethyl acetate. Further, 25 parts of the wax dispersion liquid and 12 parts of the colorant master batch P1 are added to the vessel. The vessel contents are stirred by a TK HOMOMIXER (from PRIMIX Corporation) at a revolution of 10,000 rpm at 50° C. so that they are uniformly dissolved or dispersed. Further, 10 parts of the prepolymer 1 are dispersed therein. Thus, an oily phase 5 is prepared. The temperature of the oily phase 5 is kept to 50° C. in a container.

The procedure in Example 1 is repeated except for replacing the oily phase 1 with the oily phase 5. Thus, a toner 5 and a developer 5 are prepared and subjected to the above-described quality evaluation.

The results are shown in Tables 1 and 2.

Example 6

Synthesis of Prepolymer 2

A reaction vessel equipped with a condenser tube, a stirrer, and a nitrogen inlet pipe is charged with 3-methyl-1,5-pentanediol, isophthalic acid, adipic acid, and trimellitic anhydride in amounts such that the ratio of OH groups to COOH groups becomes 1.5. The molar ratio of the isophthalic acid to the adipic acid, both serving as a dicarboxylic acid, is 40/60. The amount of the trimellitic anhydride is 1% by mol based on total amount of the monomers. Titanium tetrapropoxide in an amount of 1,000 ppm based on total amount the monomers is further contained in the vessel. The vessel contents are heated to 200° C. over a period of 4 hours, further heated to 230° C. over a period of 2 hours, until no efflux is observed. The reaction is further continued for 5 hours under reduced pressures of from 10 to 15 mmHg. Thus, an intermediate polyester 2 is prepared.

Another reaction vessel equipped with a condenser tube, a stirrer, and a nitrogen inlet pipe is charged with the intermediate polyester 2 and isophorone diisocyanate (IPDI) in amounts such that the ratio of isocyanate groups in IPDI to hydroxyl groups in the intermediate polyester becomes 2.0. After being diluted with a 50% aqueous solution of ethyl acetate, the vessel contents are subjected to a reaction for 5 hours at 100° C. Thus, a prepolymer 2 is prepared.

Production of Toner 6 and Developer 6

The procedure in Example 5 is repeated except for replacing the prepolymer 1 with the prepolymer 2. Thus, a toner 6 and a developer 6 are prepared and subjected to the above-described quality evaluation.

The results are shown in Tables 1 and 2.

TABLE 1

| | Toner No. | Deformation Rate (%) | Thermal Properties | | | | | Particle Size Distribution | | Dispersion Diameter of First Phase-contrast Images (nm) |
| --- | --- | --- | --- | --- | --- | --- | --- | --- | --- | --- |
| | | | Tg (° C.) | Tm (° C.) | Q1 (J/g) | Q2 (J/g) | Q2/Q1 | Dv (μm) | Dv/Dn | |
| Example 1 | 1 | 3.5 | 48 | 56 | 38 | 10 | 0.26 | 5.3 | 1.15 | 50 |
| Example 2 | 2 | 1.5 | 52 | 58 | 32 | 10 | 0.31 | 5.2 | 1.15 | 50 |

TABLE 1-continued

|  | Toner No. | Deformation Rate (%) | Thermal Properties | | | | | Particle Size Distribution | | Dispersion Diameter of First Phase-contrast Images (nm) |
|---|---|---|---|---|---|---|---|---|---|---|
|  |  |  | Tg (°C.) | Tm (°C.) | Q1 (J/g) | Q2 (J/g) | Q2/Q1 | Dv (μm) | Dv/Dn |  |
| Example 3 | 3 | 1.0 | 47 | 67 | 44 | 27 | 0.61 | 5.4 | 1.15 | 60 |
| Example 4 | 4 | 4.3 | 48 | 56 | 20 | 10 | 0.5 | 5.4 | 1.15 | 30 |
| Example 5 | 5 | 1.0 | 49 | 56 | 34 | 11 | 0.32 | 5.2 | 1.15 | 50 |
| Example 6 | 6 | 2.8 | 41 | 56 | 34 | 10 | 0.29 | 5.3 | 1.14 | 50 |
| Comparative Example 1 | 7 | 6.2 | 38 | 56 | 21 | 11 | 0.52 | 5.2 | 1.15 | 50 |
| Comparative Example 2 | 8 | 2.3 | 56 | 60 | 28 | 10 | 0.36 | 5.3 | 1.14 | 50 |

TABLE 2

| | Toner No. | Developer No. | Quality Evaluations | | | |
|---|---|---|---|---|---|---|
| | | | Low-temperature Fixability | Fixable Temperature Range | Heat-resistant Storage Stability | Storage Stability under High-temperature and High-humidity Conditions |
| Example 1 | 1 | 1 | AA | A | AA | A |
| Example 2 | 2 | 2 | AA | A | AAA | AA |
| Example 3 | 3 | 3 | A | A | AAA | AA |
| Example 4 | 4 | 4 | AA | A | A | A |
| Example 5 | 5 | 5 | A | AA | AAA | AA |
| Example 6 | 6 | 6 | AA | AA | AA | AA |
| Comparative Example 1 | 7 | 7 | AA | A | A | C |
| Comparative Example 2 | 8 | 8 | C | A | AAA | AA |

What is claimed is:

1. A toner, comprising:
a binder resin comprising a polyester resin,
wherein the polyester resin is a copolymer having an amorphous polyester segment and a crystalline segment, the amorphous polyester segment being obtained by condensation polymerization of an alcohol and a carboxylic acid including an aliphatic dicarboxylic acid and an aromatic dicarboxylic acid,
when the toner is subjected to a pressure of 100 gf at a temperature of 40° C. and a relative humidity of 80%, the toner deforms with a deformation rate of from 1.0% to 5.0%,
when the toner is observed with an atomic force microscope in tapping mode to obtain a phase image and the phase image is binarized by using an intermediate value between maximum and minimum phase difference values to obtain a binarized image, the binarized image consists of first phase-contrast images serving as large-phase-difference portions and second phase-contrast images serving as small-phase-difference portions with the first phase-contrast images dispersed in the second phase-contrast images and the first phase-contrast images having a dispersion diameter of 100 nm or less, and
when the toner is subjected to a differential scanning calorimetric measurement, an endothermic quantity Q1 measured in a first heating is from 10 to 50 J/g, and a ratio Q2/Q1 of an endothermic quantity Q2 measured in a second heating to the endothermic quantity Q1 measured in the first heating is 0.65 or less.

2. The toner according to claim 1, wherein, in the copolymer, the amorphous polyester segment and the crystalline segment are bound by an urethane bond or an urea bond.

3. The toner according to claim 2, wherein the amorphous polyester segment has a glass transition temperature of from 50° C. to 70°C.

4. The toner according to claim 2, wherein a weight ratio of the amorphous polyester segment to the crystalline segment in the copolymer is from 1.5 to 4.0.

5. The toner according to claim 1, wherein the binder resin further comprises a modified polyester resin.

6. A process cartridge, comprising:
an electrostatic latent image bearer; and
a developing device configured to develop an electrostatic latent image formed on the electrostatic latent image bearer into a visible image with the toner according to claim 1,
wherein the process cartridge is detachably mountable on an image forming apparatus.

7. A developer, comprising:
the toner according to claim 1; and
a carrier.

8. An image forming apparatus, comprising:
an electrostatic latent image bearer;
an electrostatic latent image forming device configured to form an electrostatic latent image on the electrostatic latent image bearer; and a developing device configured to develop the electrostatic latent image into a visible image with the toner according to claim 1.

9. The toner according to claim 1, wherein the copolymer has a glass transition temperature of from 40° C. to 70° C.

10. The toner according to claim 1, wherein the amorphous polyester segment has a glass transition temperature of from 50° C. to 70° C.

11. The toner according to claim 1, wherein a weight ratio of the amorphous polyester segment to the crystalline segment in the copolymer is from 1.5 to 4.0.

12. The toner according to claim 1, wherein the aliphatic dicarboxylic acid is at least one selected from the group consisting of succinic acid, adipic acid, sebacic acid, azelaic acid, dodecanedicarboxylic acid, octadecanedicarboxylic acid, decyl succinic acid, dodecenyl succinic acid, pentadecenyl succinic acid, octadecenyl succinic acid, maleic acid, fumaric acid, citraconic acid, and dimmer acid.

13. The toner according to claim 1, wherein the aromatic dicarboxylic acid is at least one selected from the group consisting of phthalic acid, isophthalic acid, t-butyl isophthalic acid, terephthalic acid, 2,6-naphthalenedicarboxylic acid, and 4,4'-biphenyl dicarboxylic acid.

14. The toner according to claim 1,
wherein the aliphatic dicarboxylic acid is at least one selected from the group consisting of succinic acid, adipic acid, sebacic acid, azelaic acid, dodecanedicarboxylic acid, octadecanedicarboxylic acid, decyl succinic acid, dodecenyl succinic acid, pentadecenyl succinic acid, octadecenyl succinic acid, maleic acid, fumaric acid, citraconic acid, and dimmer acid, and
the aromatic dicarboxylic acid is at least one selected from the group consisting of phthalic acid, isophthalic acid, t-butyl isophthalic acid, terephthalic acid, 2,6-naphthalenedicarboxylic acid, and 4,4'-biphenyl dicarboxylic acid.

15. The toner according to claim 1, wherein the aromatic dicarboxylic acid is at least one selected from the group consisting of terephthalic acid, isophthalic acid, and t-butyl isophthalic acid.

16. The toner according to claim 1, wherein the alcohol is at least one polyol selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol.

17. The toner according to claim 1, wherein the copolymer is a block copolymer.

18. The toner according to claim 1, wherein the copolymer has a melting point of from 50° C. to 75° C.

19. The toner according to claim 1, further comprising:
at least one selected from the group consisting of a crystalline resin, a colorant, a release agent, a charge controlling agent, and an external additive.

20. The toner according to claim 1, further comprising:
a crystalline resin.

* * * * *